US006443604B1

(12) United States Patent
Rudenberg

(10) Patent No.: US 6,443,604 B1
(45) **Date of Patent: *Sep. 3, 2002**

(54) REMOTELY ACTIVATED HIGH-CANDLE POWER ILLUMINATION

(75) Inventor: Murray Rudenberg, 4446 Mistral Pl., San Diego, CA (US) 92130

(73) Assignee: Murray Rudenberg

(*) Notice: Subject to any disclaimer, the term of this patent is extended or adjusted under 35 U.S.C. 154(b) by 0 days.

This patent is subject to a terminal disclaimer.

(21) Appl. No.: 09/489,552

(22) Filed: Jan. 21, 2000

Related U.S. Application Data

(63) Continuation of application No. 09/399,820, filed on Sep. 21, 1999, now abandoned, which is a continuation of application No. 08/865,914, filed on May 30, 1997, now Pat. No. 5,988,838.

(51) Int. Cl.[7] .................................................. B60Q 3/00

(52) U.S. Cl. ....................... 362/488; 362/517; 362/241; 362/276; 362/802; 340/426; 340/468

(58) Field of Search ................................ 362/512, 514, 362/517, 276, 546, 802, 488, 233, 490, 277, 280, 282, 319, 322, 323, 324, 346, 297, 396, 240, 241; 340/468, 471, 473, 426

(56) References Cited

U.S. PATENT DOCUMENTS

| | | | | | |
|---|---|---|---|---|---|
| 1,906,568 A | | 5/1933 | Garvin | ....................... | 362/488 |
| 2,095,928 A | | 10/1937 | Ferguson | ..................... | 362/68 |
| 3,117,302 A | | 1/1964 | Caradarelli et al. | ......... | 362/249 |
| 4,143,368 A | * | 3/1979 | Route et al. | ................ | 340/543 |
| 4,423,472 A | | 12/1983 | Duthu | ........................ | 362/184 |
| 4,433,362 A | | 2/1984 | Ban | ............................ | 362/86 |
| 4,722,030 A | | 1/1988 | Bowden | ...................... | 362/69 |
| 4,754,255 A | * | 6/1988 | Sanders et al. | ............... | 340/64 |
| 4,779,168 A | | 10/1988 | Montgomery | ................ | 362/66 |
| 4,981,363 A | | 1/1991 | Lipman | ....................... | 362/68 |
| 5,031,082 A | | 7/1991 | Bierend | ...................... | 362/233 |
| 5,182,541 A | * | 1/1993 | Bajorek et al. | ............. | 340/428 |
| 5,195,813 A | | 3/1993 | Brown | ........................ | 362/61 |
| 5,584,560 A | * | 12/1996 | Gosswiller et al. | ......... | 362/287 |
| 5,607,217 A | | 3/1997 | Hobbs II | ..................... | 362/35 |

OTHER PUBLICATIONS

DAMARK Catalog, p. 35.
D–Mail Catalog, vol. 141, p. 51.
AutoTracker, www.carpentergroup.com., Date Unknown.

* cited by examiner

*Primary Examiner*—Thomas M. Sember
(74) *Attorney, Agent, or Firm*—Fitch, Even, Tabin & Flannery

(57) ABSTRACT

A method of illuminating a region outside a vehicle, and a system for accomplishing the method, the method consisting of the steps of: receiving a signal from outside of the vehicle; activating, in response to the receiving the signal, at least one lamp within the vehicle; and illuminating, in response to the activating of the at least one lamp, the region outside the vehicle. The illumination is at least 180 degrees around the vehicle and includes projecting light from the at least one lamp within the vehicle to the region outside the vehicle. In variations of this embodiment, the illuminating includes intermittently illuminating the at least one lamp by projecting light in a flashing manner from the at least one lamp within the vehicle to the region outside the vehicle.

33 Claims, 13 Drawing Sheets

REMOTELY ACTIVATED HIGH-CANDLE POWER ILLUMINATION

This application is a Continuation-In-Part (CIP) of U.S. Ser. No. 09/399,820 filed Sep. 21, 1999, entitled "REMOTELY ACTIVATED HIGH-CANDLE POWER ILLUMINATION", now abandoned, which is a Continuation of U.S. Ser. No. 08/865,914, filed May 30, 1997, entitled "REMOTELY ACTIVATED HIGH-CANDLE POWER ILLUMINATION", now U.S. Pat. No. 5,988,838, the entirety of which application and patent are hereby incorporated by reference.

BACKGROUND OF THE INVENTION

The present invention relates to remotely-activated illumination, and more particularly to remotely-activated high-candle power illumination for automobiles. Even more particularly, the present invention relates to remotely activated high-candle power illumination approaches for areas around automobiles for increasing personal safety.

Personal safety is of increasing public concern as crimes against individuals, and in particular, violent crimes against individuals, continue to claim their place as part of modern society. Various approaches have been introduced in the automobile and home arenas, such as intrusion alarms, panic buttons, illuminated entry systems, auto headlamp delay systems, pepper spray, stun guns and other personal weaponry, in attempts to increase personal safety.

Problematically, intrusion alarms, while potentially effective, are primarily directed to protecting property rather than individuals, and therefore are of limited value in protecting individuals. Panic buttons require that the user recognize and react to a potential danger, and thus are generally ineffective in truly surprise attacks.

Auto lamp-delay systems, unfortunately, only provide unidirectional illumination outside the front end of the vehicle for a specified period of time while the user exits the vehicle following the vehicle's key being turned to an off position. Auto lamp-delay systems do not provide any illumination as the user returns to and enters the vehicle.

Illuminated entry systems, while, unlike auto lamp-delay systems, potentially provide both entry and exit illumination, unfortunately illuminate only the interior of the vehicle using what is typically no more than a 20 watt unreflected diffuse light source in a translucent casing, and therefore provide little or no deterrence to would-be attackers in areas outside the vehicle.

Problematically, personal weaponry generally requires close proximity to or contact with the user with the intended target and, obviously, prior recognition of the target by the user. Thus personal weaponry not only suffers from requiring close proximity to or contact with the attacker, thus potentially increasing danger to the user, but requires that the user become aware of the attacker, recognize the attacker as an attacker, prepare the personal weaponry for use, move into close proximity to the attacker, and activate the personal weaponry. As a result, personal weaponry may be ineffective or less effective than needed in a wide range of circumstances, such as in the case of a surprise attack, and may pose unnecessary danger to the user, such as where the attacker is able to turn the personal weaponry against the user or to attack the user before he or she can activate the personal weaponry. Furthermore, personal weaponry generally requires training for safe operation, and may not be readily available to all who need it, either due to cost, or governmental restrictions or licensing requirements.

Thus, there is a significant need for innovation in the area of personal safety, particularly with respect to automobiles, that provides effective protection both in entry and exit situations, that does not require special training or licensing, or close proximity to a would-be attacker in order to be effective. Further, what is needed is an approach specifically aimed at providing personal safety, in addition to protecting property.

A further problem presently facing the operator of an automobile is poor street lighting. As municipalities attempt to reduce costs by seeking out and using more energy efficient and generally less bright street lighting schemes, users are frequently faced with entering and exiting their vehicles in poor lighting situations. Thus, in addition to the above-mentioned personal safety need, which is increased in poor lighting situations, there is a need for improved lighting for exterior regions about an automobile as the user of the automobile enters and exits. Furthermore, such need extends to emergency situations in which mechanical, electrical or other vehicle failures may necessitate stopping the vehicle in unlit or poorly lit situations, so that, for example, repair or diagnosis can be effected, such as the changing of a flat tire. Solutions to such lighting needs can further be of benefit in situations such as, for example, when loading or unloading of the vehicle must occur, such as loading or unloading groceries, or when passengers must embark or disembark in situations where uneven pavement, curbing or unpaved areas are present.

Various prior art lighting systems have been proposed, such as controlling a spotlight on a boat or automobile, in order to provide for personal safety. U.S. Pat. No. 4,779,168 (Montgomery) and U.S. Pat. No. 4,722,030 (Bowden) each show examples of these types of systems. These systems, however, problematically require expensive and specialized hardware integrally associated with the automobile or boat and that is not commonplace or readily available to the average vehicle user.

Thus, significant problems remain and a need for improvement exists in the field of personal safety with respect to automobiles and other vehicles. The present invention advantageously addresses the above and other needs.

SUMMARY OF THE INVENTION

The present invention advantageously addresses the needs above as well as other needs by providing an approach for remotely activated high-candlepower illumination of areas around automobiles and for increasing personal and property safety.

In one embodiment, the present invention may be characterized as a method of illuminating a region outside a vehicle comprising the steps of: receiving a signal from outside of the vehicle; activating, in response to the receiving the signal, at least one lamp within the vehicle; and illuminating, in response to the activating of the at least one lamp, the region outside the vehicle. The illumination is at least 180 degrees around the vehicle and includes projecting light from the at least one lamp within the vehicle to the region outside the vehicle. In variations of this embodiment, the illuminating includes intermittently illuminating the at least one lamp by projecting light in a flashing manner from the at least one lamp within the vehicle to the region outside the vehicle.

In another embodiment, the present invention may be characterized as a remotely-controlled illumination system comprising at least one lamp for providing illumination at least 180 degrees around an automobile. A remotely controlled switch is coupled to the at least one lamp and a power source is selectively coupleable through the remotely controlled switch to the at least one lamp. Also, a housing and means for positioning the housing within the vehicle are coupled to the at least one lamp. In variations of this embodiment, the system further includes a flash circuit coupled in between the remotely controlled switch and the at least one lamp such that the flash circuit causes the at least one lamp to provide illumination intermittently in a flashing manner. Furthermore, the system may be coupled to an alarm system of the automobile.

In yet anther embodiment, the present invention may be characterized as a method of illuminating a region outside a vehicle comprising the steps of: receiving an audio signal; activating, in response to the receiving the audio signal, at least one lamp within the vehicle; and illuminating, in response to the activating of the at least one lamp, the region outside the vehicle, and at least 180 degrees around the vehicle, wherein the illuminating includes projecting light from the at least one lamp within the vehicle to the region outside the vehicle.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE PREFERRED EMBODIMENTS

The following description of the presently contemplated best mode of practicing the invention is not to be taken in a limiting sense, but is made merely for the purpose of describing the general principles of the invention. The scope of the invention should be determined with reference to the claims.

Figure 1A:
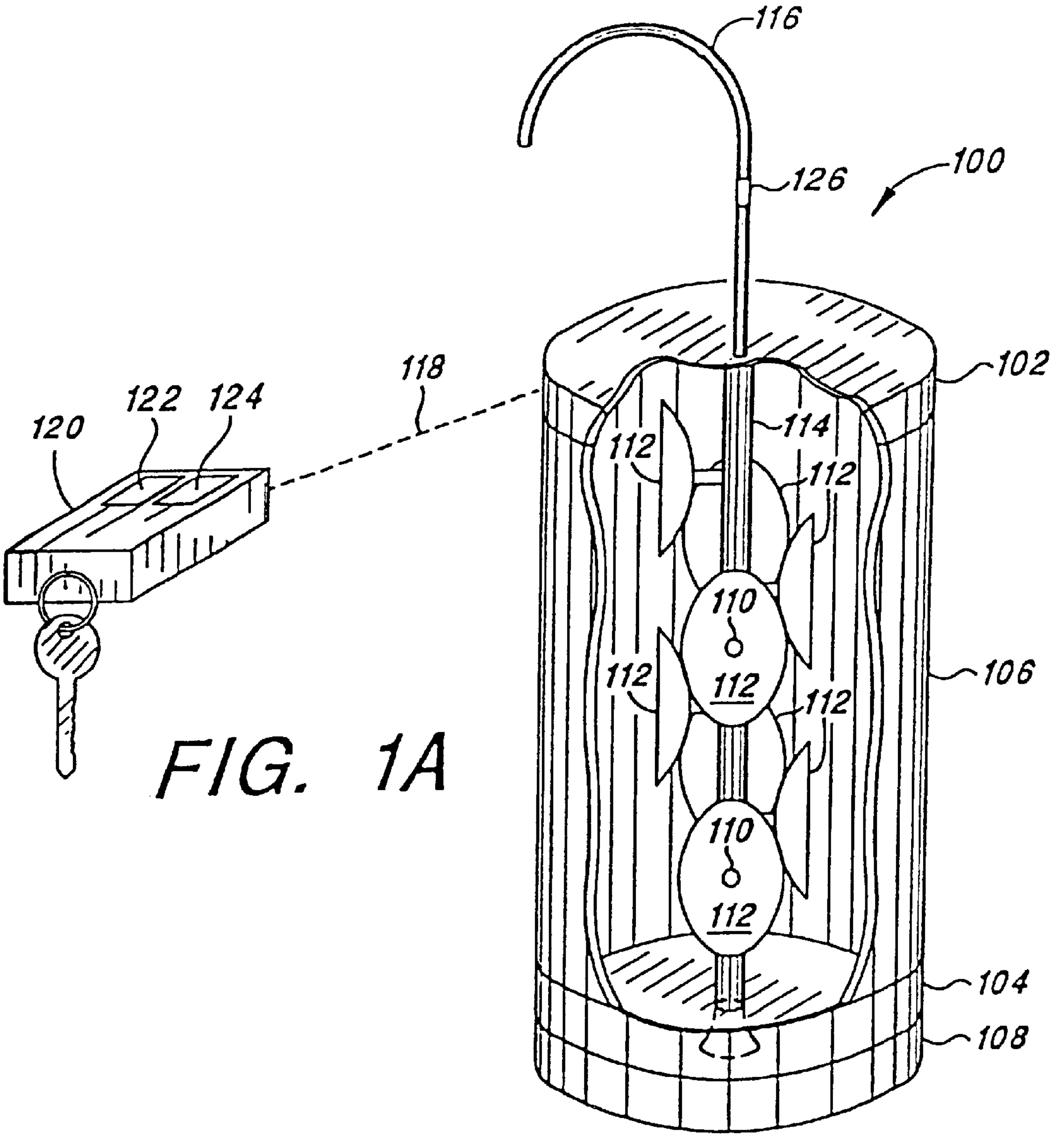
FIG. 1A is a perspective view, partially cut away, of one embodiment of a remotely-activated, high-candlepower illumination system for an automobile in accordance with the present invention.

Referring first to FIG. 1A, a perspective is shown, partially cut away, of one embodiment of the remotely activated, high-candlepower illumination system 100 for an automobile. Shown are a top housing 102, a bottom housing 104, a transparent cylindrical globe 106, an electronics housing 108, a plurality of lamps 110 and corresponding reflectors 112, a central post 114, a hook 116, a radio frequency communication channel 118, and a radio frequency transmitter 120. The lamps 110 are supported by the post 114, and are distributed about the post in a spiraling pattern.

In practice, a receiver (not shown) within the electronics housing 108 receives signals from the transmitter 120 via the radio frequency communications channel 118 in the form of "on" signals, and "off" signals, much in the same way as "arm" signals and "disarm" signals are transmitted from, e.g., a key fob transmitter to a receiver in an automobile alarm system, such as is well known in the art. Upon receipt of an "on" signal, the receiver controls an electronic switch (not shown) within the electronics housing (108) to connect power from a battery (not shown) within the electronic housing 108 to the lamps 110, causing them to emit a high-candlepower diffuse light pattern uniformally in all directions about the remotely-activated, high-candlepower illumination system 110. Upon receipt of an "off" signal from the transmitter 120, the receiver controls the electronic switch to disconnect power from the lamps 110, causing them to extinguish. The "on" signal and the "off" signal are transmitted through the communications channel 118 by the transmitter 120 in response to depressions of on and off buttons 122, 124, respectively, located on the transmitter 120.

During operation, the hook 116 is used to hang the remotely activated, high-candlepower illumination system 100 at a location within a vehicle, such as within the cabin of an automobile, for example, from a rear view mirror. In variations of the present embodiment a lanyard, rope, chain or other means may be used in lieu of the hook 116.

Advantageously, the embodiment illustrated requires no power from the automobile, instead preferably utilizing power from a battery (which may be rechargeable or not) within the electronics housing 108 to provide power. Therefore advantageously, operation of present embodiment does not pose a risk of draining the vehicle's battery. In alternative embodiments, however, and if desirable for particular applications, the vehicle's battery power may be utilized, such as through a cigarette lighter adaptor. Thus, this embodiment illustrated is intended to be powered by either an internal battery or an external battery, such as the automobile battery. Furthermore, the automobile battery may charge the internal battery or external battery (in the event the external battery is not the automobile battery).

Further advantageously, the communications channel used by the remotely-activated, high-candlepower illumination system 100 consists of air, and possibly other structures between the electronics housing 108 and the transmitter 120. The communications channel 118 can, in accordance with the present embodiment, be from fifteen to thirty feet or more in length (from 4 meters to 10 meters or more in length), for example, twenty feet or more in length (or 6 meters or more in length), thereby allowing an operator of the vehicle, for example, to activate the remotely-activated high-candlepower illumination system 100 from a point remote from the user's automobile (or other vehicle, such as a boat, bus, truck, trailer or the like). As a result of this remote activation, a safe and well-illuminated environment surrounding the vehicle is assured upon approach of the user to the vehicle. Further, a flash circuit implemented with a suitable timer may be implemented for activation in response to a "panic signal", which may be initiated by the transmitter 120, for example, in response to a depression of both the "on" and "off" buttons 122, 124 simultaneously or by a depression of a panic button (not shown). Advantageously, the flash circuit can be employed in emergency situations to attract attention and to discourage would-be attackers. As a further alternative, an emergency signal described in a visual morse code sequence, spelling out S-0-S, for example, may be programmed for emergency situations. Also, a manual on/off switch (not shown) on the bottom housing 104 or electronics housing 108 connected in parallel and/or series with the electronic switch, may be used to manually activate or deactivate the lamps 110 from the remotely-activated high-candlepower illumination system 100.

The light emitted from the lamps 110 have a total candlepower at the lamps 110 of at least 30,000 to 500,000, for example at least 100,000 candlepower, for example, 300,000 candlepower with the lamp's 110 providing illumination at an average maintained illuminance of from between 0.2 to 1 and 2 to or more foot candles at a point from between 15 and 30 feet or more from the lamps. (See, for example, Rea, LIGHTING HANDBOOK, 8th Ed., which specifies 0.5 foot candles as an average maintained illuminance for use in security lighting, parking lots and the like). The lamps 110 are preferably Halogen, Krypton, or other high-output lamps, such that a maximum candlepower output is achieved by the remotely-activated, high-candlepower illumination system 100 with minimal current draw.

The reflectors 112 are tailored so as to, in conjunction with one another, spread clear light 360 degrees about the remotely activated, high-candlepower illumination system 100, while individually acting to make maximal use of the light emitted from each respective lamp 110. The reflectors 112 may be of any shape suited to achieve the above functions, such as square, conical (or funnel-shaped), parabolic, hyperbolic, elliptical, hemispherical, hemicylindrical, and the like. The angle of the reflectors may be charged by fixing their lower edges to the lower housing 104 (or possibly an upper edge at an adjacent reflector) using control rods (not shown) and raising or lowering the post 114 by for example turning a threaded thumbscrew on the lower housing.

The top and bottom housings 102, 104, the electronics housing 108 and the transparent cylindrical globe 106 together determine the overall dimensions of the remotely-activated, high-candlepower illumination system, which is preferably small enough to conveniently fit within, and be supported by the interior of an automobile, such as hanging from a rear-view mirror. Such dimensions may be, for example, a diameter of from between 3 inches to 7 inches, and 12 inches to 20 inches, for example, from between 5 inches and 15 inches, for example, 10 inches, and a height of from between 5 inches to 10 inches, and 20 inches to 20 inches, for example, from between 7 inches and 25 inches, for example, 15 inches.

The receiver, which receives the "on" signals and the "off" signals, and controls the electronic switch so that power is applied to or disconnected from the lamps 110, is preferably a radio frequency receiver, but may be an infrared receiver, an ultrasonic receiver, or the like if paired with an appropriate transmitter in a particular application. In further embodiments, the radio frequency receiver may be replaced by or used in addition to a visual sensor, motion sensor, audio sensor, and a voltage sensor, which will cause power to be supplied to the lamps 110, which is described further with reference to FIGS. 2B–2D. Thus, the lamps may be activated in response to a person walking too close to the automobile, shining a flashlight into the automobile, "rocking" the automobile, or in response to sudden noises such as car alarms or in response to voltage changes, for example, in the voltage of the automobile battery.

The hook 116 is preferably plastic, or rubberized metal, and is selected so as to prevent damage to the interior of the vehicle in which the present embodiment is utilized. The hook 116 is fixed to the upper housing 102, and advantageously includes a hinge 126 at its center (or alternatively at its junction with the upper housing 112) so that it can be folded down into a storage position while not in use. Preferably, the remotely-activated high-candle power illumination system is designed such that it can easily be stored with a beverage container, commonly found within most automobiles. Alternatively, and instead of the hook 116, a lanyard, rope or chain may be employed by which the remotely-activated high-candlepower illumination system 100 may be suspended.

Figure 1B:
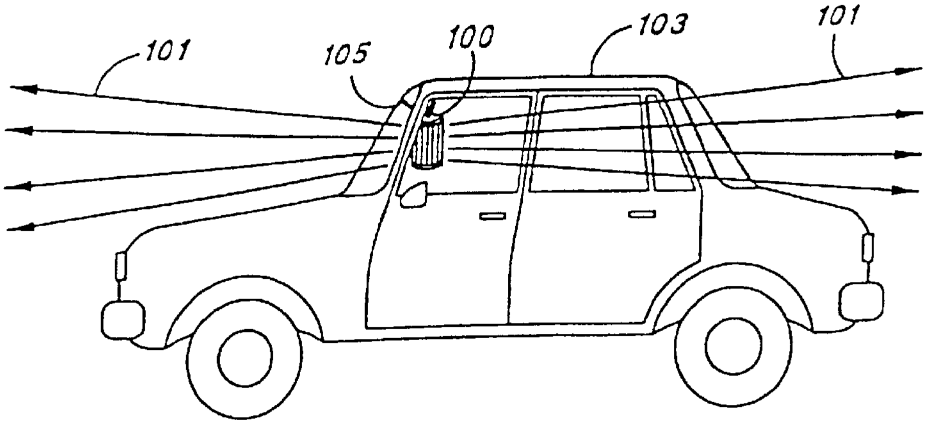
FIG. 1B is a side-perspective view of one embodiment of the remotely-activated, high-candlepower illumination system of FIG. 1A in an automobile in accordance with one embodiment.
Figure 1C:
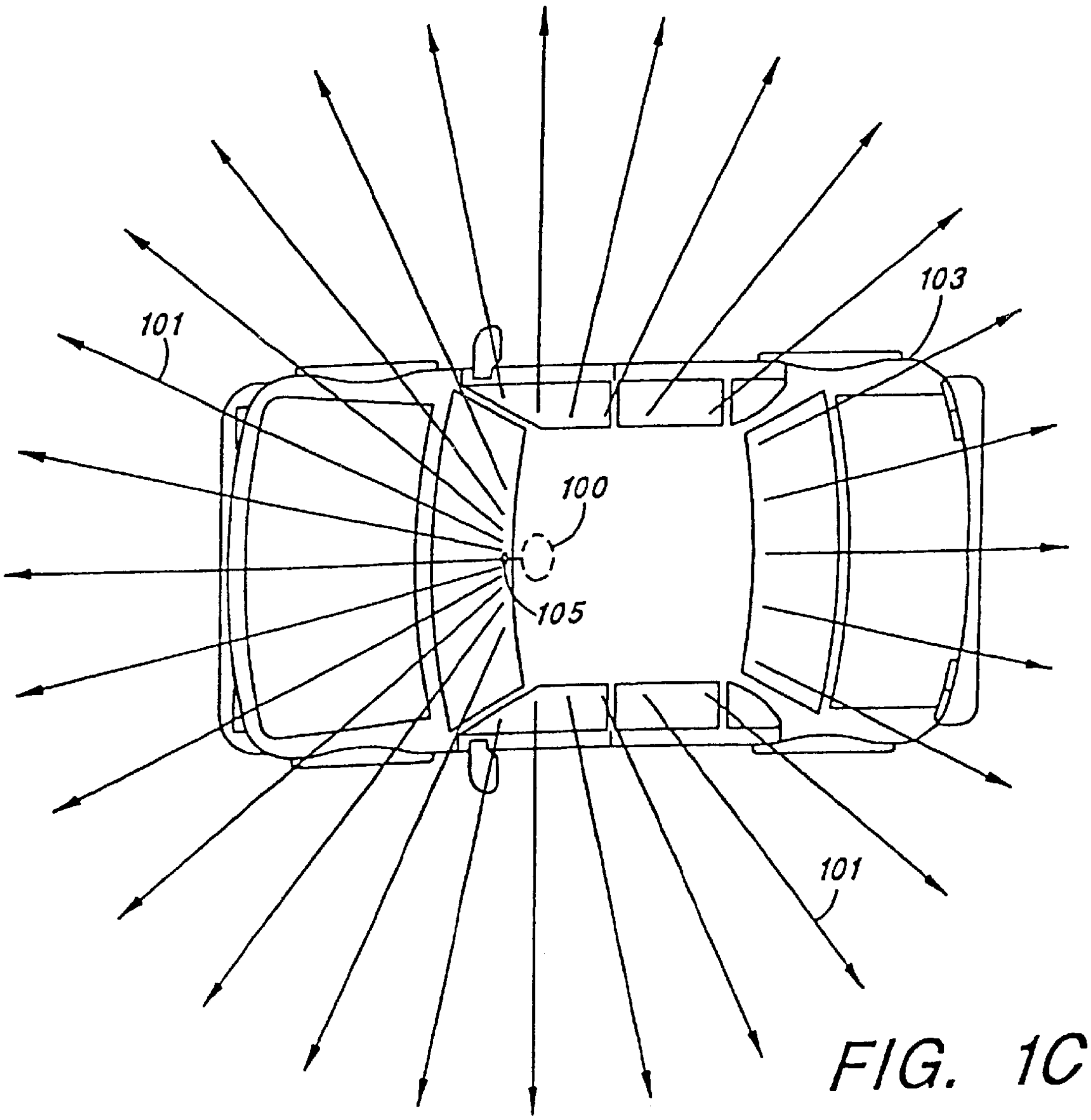
FIG. 1C is a top perspective view of one-embodiment of the remotely-activated high-candlepower illumination system of FIG. 1B in an automobile.

Referring next to FIGS. 1B and 1C, a side and top perspective view, respectively, as shown in accordance with one embodiment of the system of FIG. 1A. The remotely-activated high-candlepower illumination system 100 is hanging on a rear view mirror 105 within an automobile 103. The light 101 is projected from within the automobile 103 greater than 180° and up to 360° outside of the automobile, preferably greater than 270°. As shown, the light 101 extends a certain range outside of the automobile 103 to illuminate objects or persons with the region surrounding the automobile 103.

Figure 2A:
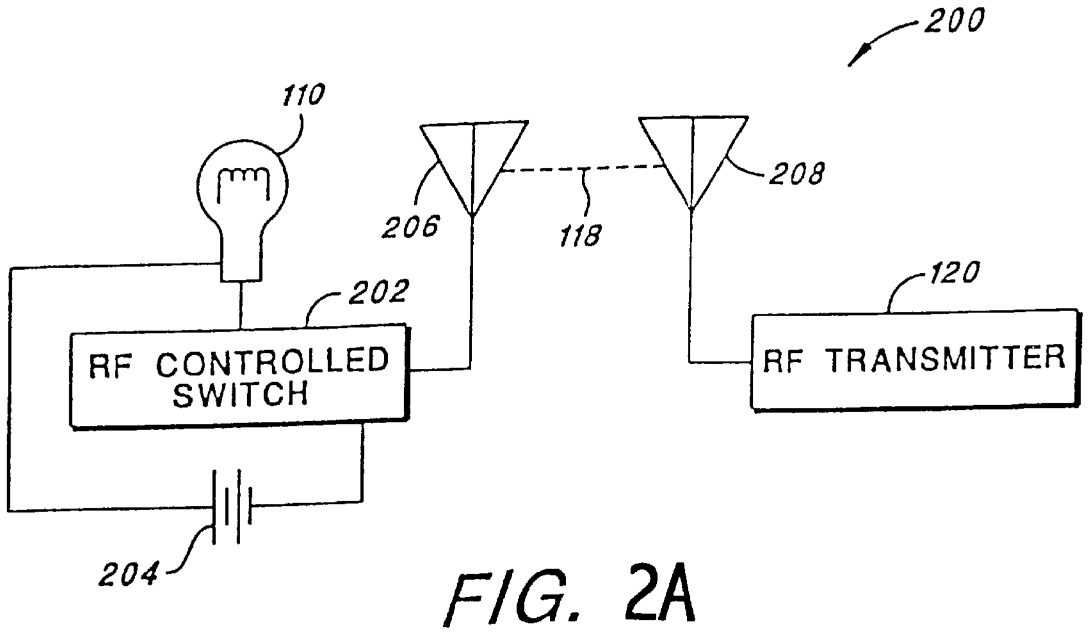
FIG. 2A is a schematic diagram showing one variation of an electrical system employed in the remotely-activated, high-candlepower illumination system of FIG. 1A.

Referring next to FIG. 2A, a schematic diagram is shown of one variation of an electrical subsystem 200 employed in the remotely activated, high-candlepower illumination system. Shown are the receiver and electronic switch (or radio frequency controlled switch 202), the battery 204, a lamp 110 (or, in accordance with various embodiments, an array of such lamps), a receiver antenna 206, the communications channel 118, a transmitter antenna 208, and the transmitter 120.

The lamp 110, the receiver and electronic switch 202, and the battery 204 are connected in a series combination. The receiver antenna 206 is connected to the receiver and electronic switch 202, and the transmitter antenna 208 is connected to the transmitter 120.

In operation, the transmitter 120 transmits the "off" signals and the "on" signals to the receiver 202 via the communications channel 118 in response to depressions of the on and off buttons, respectively, located on the transmitter 120. Upon receipt of an "on" signal, the receiver controls the electronic switch to connect power from the battery 204 to the lamp 110, causing it to emit a high-candlepower clear light pattern extending over, for example, a 180 to 360 degree range about the remotely-activated, high-candlepower illumination system. Upon receipt of an "off" signal from the transmitter 120, the receiver controls the electronic switch to disconnect power from the lamp 110, causing it to extinguish. Note that while a single lamp is depicted, a plurality of lamps (such as in FIG. 1A) may be controlled independently and/or as a group using either a single radio frequency controlled switch or a separate radio frequency controlled switch for each lamp. Similarly, an electronic dimmer switch may be employed in lieu of the radio frequency controlled switch to selectively dim the lamps either independently or as a group in response to for example, a "dim" signal and a "brighten" signal transmitted by the transmitter in response to a depression of a dim or brighten button, respectively. Furthermore, a flash circuit, as described above and further below, may be coupled to the lamp 110 so that the lamp 110 will be caused to strobe or flash upon activation.

Figure 2B:
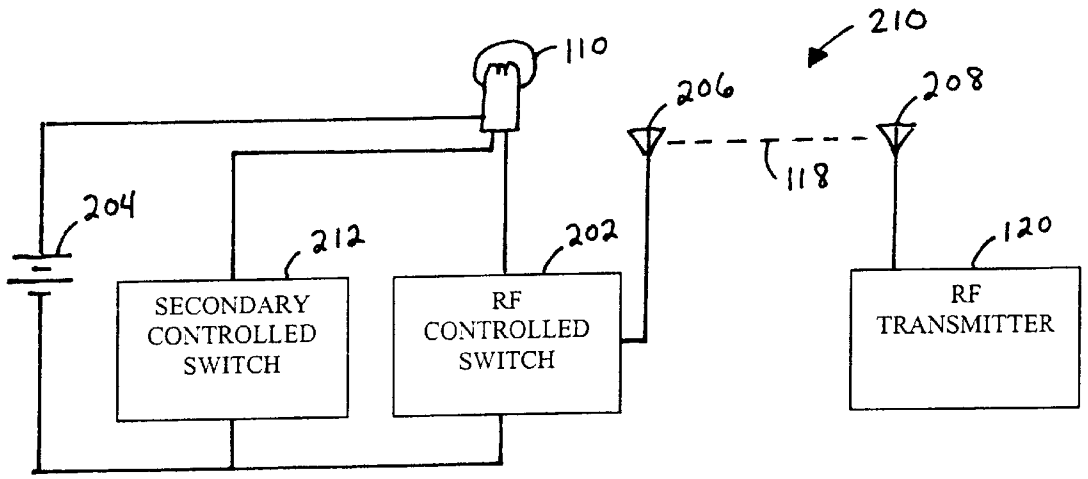
FIG. 2B is a functional block diagram of another variation of an electrical subsystem employed in the remotely-activated, high-candlepower illumination system of FIG. 1A.

Referring next to FIG. 2B, a functional block diagram is shown of another variation of an electrical subsystem 210 employed in the remotely-activated, high-candlepower illumination system of FIG. 1A. The electrical subsystem 210 of FIG. 2B has the same components as FIG. 2A, with the addition of a secondary controlled switch 212 that is also arranged in a series arrangement with the battery 204 and the lamp 110, but is in parallel with the RF controlled switch 202 or electronic switch 202. In differing embodiments, the secondary controlled switch 212 may be a motion controlled switch, a visual controlled switch, an audio controlled switch, or a voltage controlled switch.

In this embodiment of FIG. 2B, in addition to functioning as described with reference to FIG. 2A, the remotely-activated, high candlepower illumination system may also be activated in response to a secondary controlled switch 212, depending on the embodiment employed, may accomplish a variety of functions.

In a first embodiment, the secondary controlled switch 212 may be a motion controlled switch or a motion sensor that is employed within the illumination system. The motion controlled switch (i.e. secondary controlled switch 212), upon sensing a predetermined or "set" level of motion will switch power from the battery 204 to the lamp 110. In other words, the motion-controlled switch (motion sensor) receives a "motion signal" generated typically from outside the vehicle. This motion signal is in the form of a disturbance of the motion of the vehicle and may be, for example, a person leaning on the vehicle or rocking the vehicle. Even an earthquake or other seismic activity will generate a motion signal that is received by the motion controlled switch. Thus, advantageously, the motion controlled switch will cause the lamp 110 to emit light if the someone is attempting to break into the vehicle, or is leaning on the vehicle, or "rocking" the vehicle, similar to a standard car-audio alarm. In effect, the lamp 110 will illuminate a region outside of the vehicle as well as the persons causing the motion; thus, deterring them from continuing further motion disturbances or from attempting to break into the vehicle, thus, protecting the vehicle while left unattended. Motion sensor devices and switches commonly used in car alarm systems, such as liquid filled devices that respond once the liquid moves a predetermined amount (like a carpenter's level), which are well known in the art, can be used in this embodiment.

Furthermore, in the embodiment using the motion controlled switch, it is preferable to have the remotely-activated, high-candlepower illumination system rigidly mounted or set in a stable location within the vehicle, so as to be more sensitive to motion.

In a second embodiment, another type of secondary controlled switch 212 would be a visual controlled switch, or a visual or light sensor. Such visual sensors detect disturbances in light entering the sensor and may be employed instead of or in addition to motion-type sensors. Thus, if a person is standing too close to the vehicle or disturbing the vehicle, without causing enough motion in the vehicle to activate a motion controlled switch, the lamp 110 (or lamp system) will be illuminated. In this case, a "visual signal" is received by a visual controlled switch (i.e. the secondary controlled switch 212). The visual signal is a disturbance in the light and pattern of light entering the visual controlled switch, such as someone standing in front of the vehicle blocking light or someone shining a flashlight into the vehicle. In response to receiving the visual signal, the visual controlled switch causes the lamp 110 to illuminate. Such visual controlled switches may be a variety of light sensitive devices as known in the art.

Third, the secondary controlled switch 212 may be an audio controlled switch which is responsive to sudden changes in sound, for example, the sound of a window breaking, or an audio car alarm activating, or a person speaking loudly next to the vehicle. In this embodiment, an "audio signal" is received into an audio controlled switch (i.e. the secondary controlled switch 212). The audio signal is a sudden change in the level of sound entering the audio signal. For example, a "clapper" type device in which an audio controlled switch responds to a "clap" or other noise may be used. In response to receiving the visual signal, the visual controlled switch causes the lamp 110 to illuminate. This embodiment is particularly advantageous since the audio signal may be received from within the vehicle in addition to being received from outside of the vehicle. For example, if a noise is created of the vehicle (depending on the sensitivity of the audio controlled switch), the audio controlled switch will cause the lamp 110 to be illuminated. Additionally, a noise generated from within the vehicle will activate the lamp 110. Advantageously, this embodiment may be used in conjunction to a standard vehicle audio alarm system without requiring an coupling between the vehicle audio alarm system and the illumination system. For example, when the vehicle alarm system is activated, the siren or alarm will sound and the audio controlled switch will cause the lamp 110 to receive power; thus illuminating a region outside of the vehicle as described above. Thus, the illumination system of this embodiment of the present invention may be used as an addition to existing vehicle alarm systems. Such audio controlled switches may be a variety of audio or sound sensitive devices as known in the art.

In a fourth embodiment, the secondary controlled switch 212 may be a voltage controlled switch, such that the switch is closed and power is supplied to the lamp 110, upon sensing a predetermined change in voltage at the voltage controlled switch (i.e. secondary controlled switch 212). Thus, the voltage controlled switch responds to a "voltage signal" that is received typically from within the vehicle. An application would be that the voltage controlled switch is coupled to the vehicle battery via a wire or other coupling device and would respond to changes in the vehicle battery voltage level in order to activate the lamp 110. The voltage controlled switch could be set to respond to the changes in voltage that might occur when a car alarm system is activated, so that again, the illumination system and a corresponding car alarm system will be designed to work together although there is no physical connection between the car alarm system and the illumination system. For example, the voltage controlled switch may be coupled via a wire to the car cigarette lighter (which may be within or along side a power supply cord connected to the cigarette lighter), which will provide a reading of the voltage changes of the battery. Such voltage controlled switches are also known in the art of car alarm systems and are commercially available.

The spirit of the embodiments above remains the protection of personal property in as much as protecting the safe haven of an automobile from unwanted entry or tampering is seen as a threat to personal safety.

Advantageously, in this embodiment, the signal being received from outside of the vehicle may be the RF signal transmitted from the RF transmitter 120, a visual signal from a person or object, a motion signal represented as a motion in the vehicle created by a person or object, an audio signal or a sound signal from outside of the vehicle or from within the vehicle, or a voltage signal typically from within the vehicle.

Additionally, the receiver that is coupled to the RF controlled switch 202 and may also be coupled to the secondary controlled switch 212 may be programmed such that lamp 110 will only be activated for a predetermined period of time, e.g. 3 minutes; thus, the vehicle battery will not be unnecessarily drained if the lamp 110 is activated and left on indefinitely. Thus, the RF controlled switch 202 and the secondary controlled switch 212 will be switched off at the predetermined time by the receiver processor or control logic (not shown) of the illumination system.

Furthermore, while the secondary controlled switch 212 may be one of the above described switches, there may be one or more secondary controlled switches 212, so that the illumination system may have a motion controlled switch, a visual controlled switch, an audio controlled switch, and a voltage controlled switch, for example. Thus, advantageously, a desired combination of secondary controlled switches 212 may be employed in the illumination system.

Figure 2C:
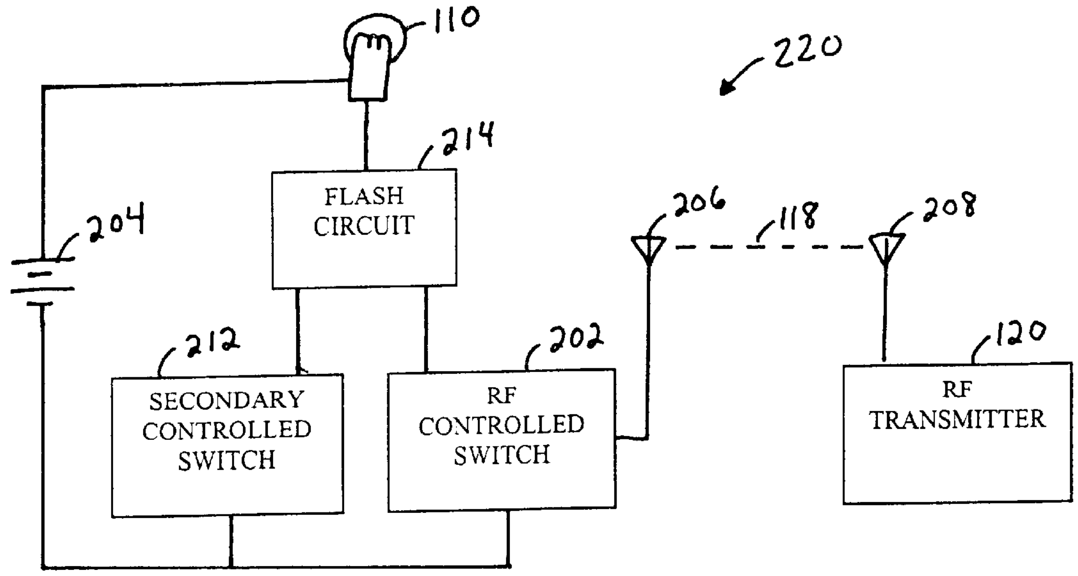
FIG. 2C is a functional block diagram of a further variation of an electrical subsystem employed in the remotely-activated, high-candlepower illumination system of FIG. 1A.

Referring next to FIG. 2C, a functional block diagram is shown of a further variation of an electrical subsystem 220 employed in the remotely-activated, high-candlepower illumination system of FIG. 1A. The electrical subsystem 220 of FIG. 2C has the same components as FIG. 2B, with the addition of flash circuit 214 that is arranged in series with the lamp 110 and both the secondary controlled switch 212, e.g. motion controlled switch, visual controlled switch, audio controlled switch, and/or a voltage controlled switch, and the RF controlled switch 202. Thus, the flash circuit 214 is coupled in between the lamp 110 and both the secondary controlled switch 212 and the RF controlled switch 202.

In this embodiment, upon activation, by either the RF controlled switch 202 (by a signal sent from the RF transmitter 120) or the secondary controlled switch 212 (by the motion, visual, or audio signal received external to the vehicle, or the audio or voltage signal received from within the vehicle), the lamp 110 is caused to flash by the flash circuit 214. Thus, the lamp 110 is intermittently illuminated in a flashing manner at a predetermined on/off flash rate.

The flash circuit 214, as described with reference to FIG. 1A, may be implemented with a suitable timer or may be implemented for activation in response to a "panic signal", which may be initiated by the transmitter 120, for example, in response to a depression of both the "on" and "off"

buttons 122, 124 simultaneously or by a depression of a panic button (not shown). Advantageously, the flash circuit 214 can be employed in emergency situations to attract attention and to discourage would-be attackers. Such flash circuits 214 are commonly available and well known in the art.

Furthermore, the frequency of the flashing may be varied depending on the desired effect. The flash circuit 214 may cause the lamp 110 to "strobe" or flash less frequently by setting the flash rate of the flash circuit 214. Alternative types of lamps 110, such as xenon lamps 110, may be used to maximize the effect of the strobe or flashing.

Figure 2D:
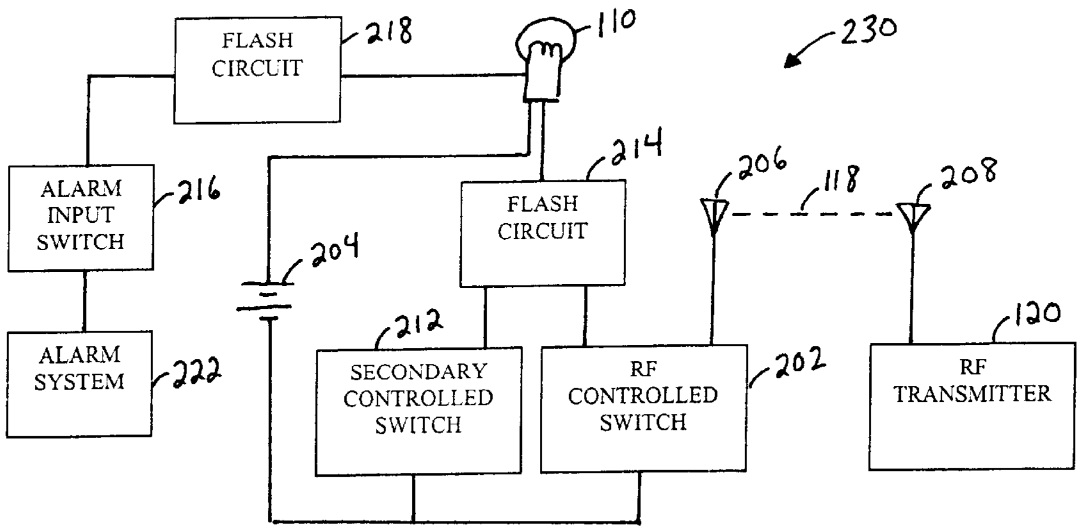
FIG. 2D is a functional block diagram of yet another variation of an electrical subsystem employed in the remotely-activated, high-candlepower illumination system of FIG. 1A.

Referring next to FIG. 2D, a functional block diagram is shown of yet another variation of an electrical subsystem employed in the remotely-activated, high-candlepower illumination system of FIG. 1A. The electrical subsystem 230 of FIG. 2D has the same components as FIG. 2C, with the addition of an optional second flash circuit 218 and an alarm input 216 that are coupled to the lamp 110. The optional second flash circuit 218 and the alarm input 216 are part of the electronics subsystem 218 of the remotely-activated, high-candlepower illumination system, while the car alarm system 222 is separate from the illumination system.

In this embodiment, the illumination system is used as an accessory to the car alarm system 222, as well as functioning in the variety of ways described above. Note that this embodiment is different from the embodiment that uses an audio controlled switch to activate the lamp 110, since there is a direct attachment to a car alarm system 222. Thus, in response to receiving an "alarm signal" from the car alarm system 222 at the alarm input 216, the remotely-activated, high-candlepower illumination system may be made to illuminate, either by flashing (with the optional second flash circuit 218) or by simply illuminating the lamp 110 (or lamp system). The alarm input 216 may simply be a switch that is responsive to the alarm signal from the car alarm system 222. Furthermore, in another embodiment, the alarm input 216 may be a part of either the secondary controlled switch 212 or the RF controlled switch 202 such that the car alarm system 222 couples directly to the secondary controlled switch 212, or the RF controlled switch 202. Alternatively, the secondary controlled switch 212 and/or the RF controlled switch 202 may be configured to also function as an alarm input 216. Typically, a wire line connection is made between the car alarm system 222 and the alarm input 216 of the electronics subsystem 230, although other types of connections may be envisioned by the skilled artist, such as using a wireless RF link between the car alarm system 222 and the electronics subsystem 230.

Thus, in operation, the illumination system will work in conjunction with a car alarm system. The car alarm system may be audio or silent, using the light from the lamp 110 as a warning to persons about the automobile, for example, and/or using the light from the lamp 110 in addition to an audio alarm.

This embodiment may be especially useful in deterring vehicle theft and vandalism, since in addition to providing an irritating siren (from the car alarm system 222), the vehicle emits a continuous or flashing illumination or strobe light. Thus, it is much easier to determine which vehicle, for example, within a crowded parking lot has been tampered with. In a time when audio car alarms are virtually ignored, a flashing illumination system may be a more effective attention-getter than the car alarm system 222 alone.

Figure 2E:
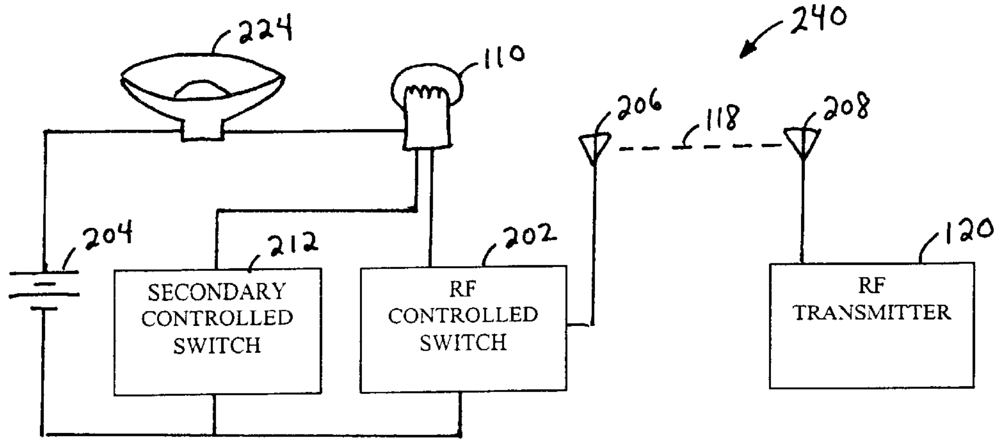
FIG. 2E is a functional block diagram of yet another variation of an electrical subsystem employed in the remotely-activated, high-candlepower illumination system of FIG. 1A.

Referring next to FIG. 2E, a functional block diagram is shown of yet another variation of an electrical subsystem employed in the remotely-activated, high-candlepower illumination system of FIG. 1A. The electrical subsystem 240 of FIG. 2E has the same components as FIG. 2B, with the addition of a siren 224 coupled in series with the lamp 110 and the battery 204; thus, this embodiment of the illumination system also has the ability to produce a high decibel, acoustic siren accompanying the illumination provided by the lamp 110, whether the illumination is constant or flashing.

Figure 17:
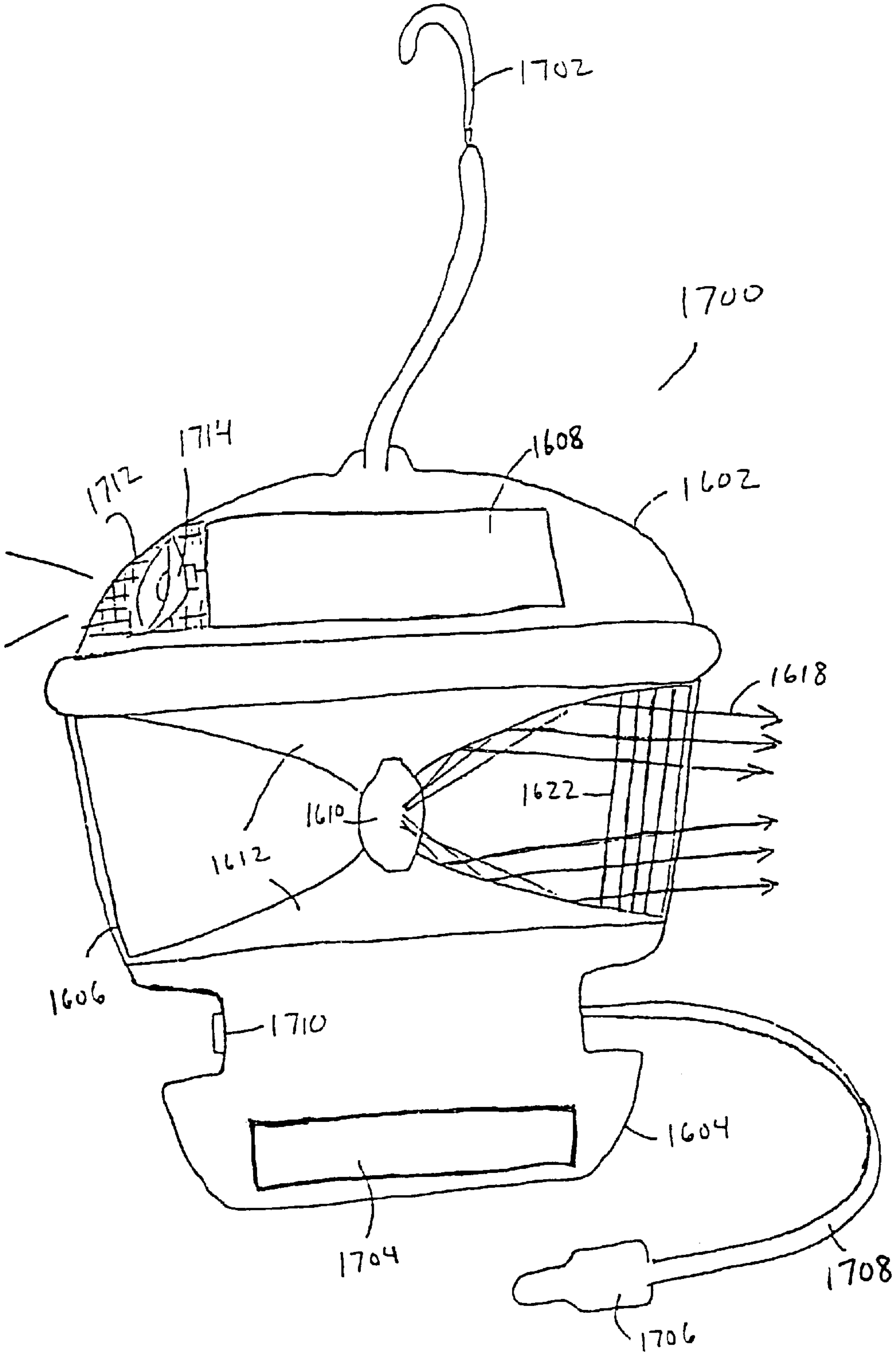
FIG. 17 is a side view of a further embodiment of a remotely-activated, high-candle power illumination system of FIGS. 16A and 16B for an automobile using a single lamp illumination and a dual-parabolic reflector design.

In this embodiment, the illumination system advantageously includes the function of providing an acoustic or audio alarm via the siren 224, in addition to providing the illumination as described above. In operation, when the lamp 110 is caused to illuminate, the siren 224, which is connected in series with the lamp 110, will be powered and caused to emit a high decibel noise. This noise may be configured as a low decibel "chirp" that indicates that the illumination system is active or may act as a high decibel horn, chirp, or alarm, similar to that of standard car audio alarm systems. The specific noise and level emitted from the siren 224 can be predetermined according to a sound card or chip (not shown) that is installed with the siren. Thus, advantageously, the illumination system does not need a separate car audio alarm system in place within the vehicle to employ an audio alarm function in addition to the illumination of the lamp 110. The siren 224 may be any small speaker or siren design common to car audio alarm systems. Furthermore, the siren may be a small speaker not designed to emit a loud siren or chirp, but a low decibel chirp or other noise to indicate that the illumination system is active. An example of one embodiment of the physical structure of an illumination system incorporating a siren 224 is shown in FIG. 17.

Furthermore, the embodiment utilizing the siren 224 may also be used with the flash circuit 214, as shown in FIG. 2C, such that the lamp will be caused to flashingly illuminate and the siren will sound at the same time. Again, the secondary controlled switch 212 and the other components are as described above.

Figure 3:
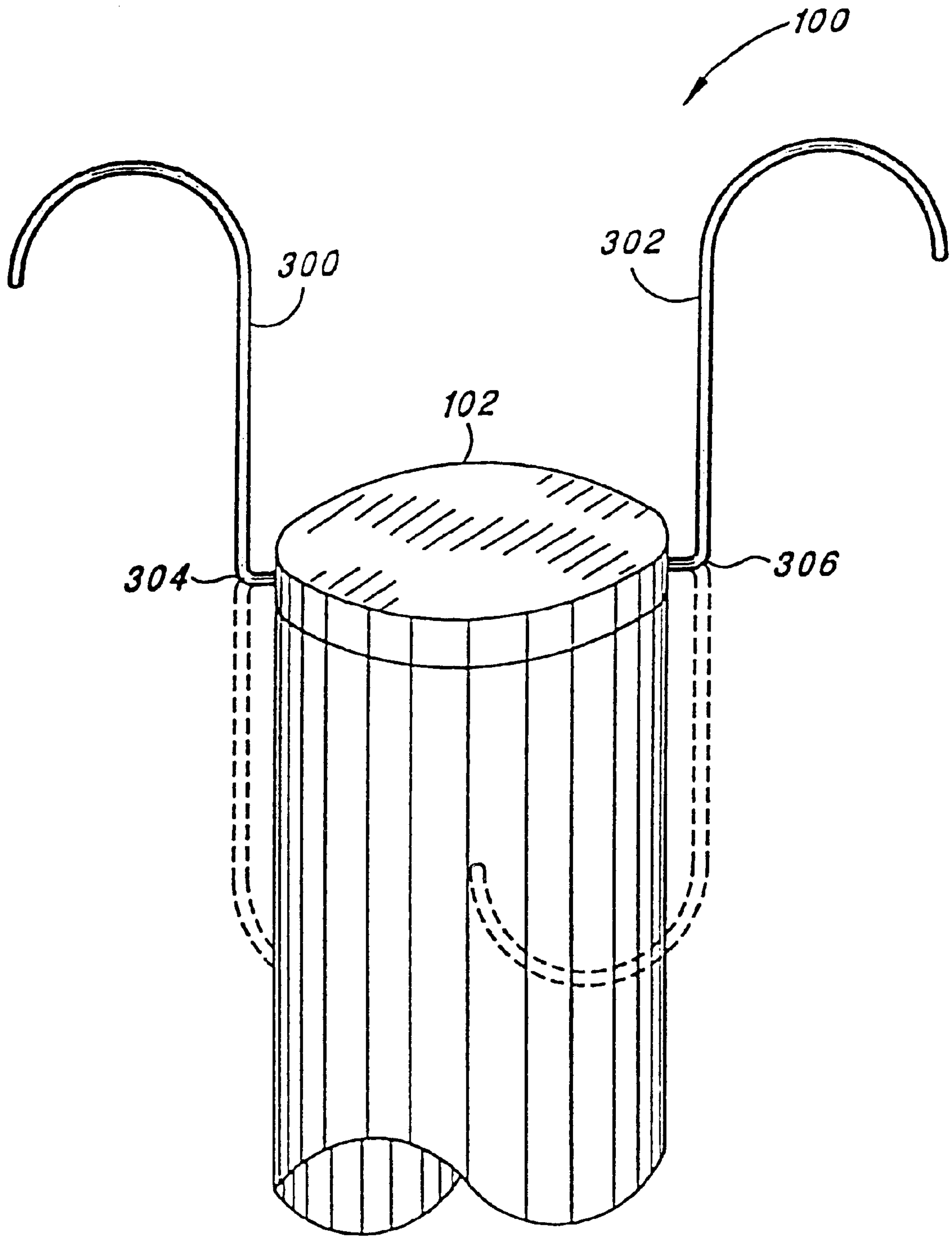
FIG. 3 is a partial perspective view of the remotely-activated, high-candlepower illumination system of FIG. 1A illustrating a pair of folding hooks useable for hanging the remotely-activated, high-candlepower illumination system in, for example, an automobile.

Referring next to FIG. 3, a partial perspective view is shown of the remotely-activated, high-candlepower illumination system 100 illustrating a pair of folding hooks 300, 302 useable for hanging the remotely-activated, high-candlepower illumination system 100 in, for example, an automobile.

During operation, the hooks 300, 302 are used to hang the remotely activated, high-candlepower illumination system 100 at a location within a vehicle, such as within the cabin of an automobile, for example, from a rear view mirror.

The hooks 300, 302 are preferably plastic, or rubberized metal and are selected so as to prevent damage to the interior of the vehicle in which the present embodiment is utilized. The hooks 300, 302 are fixed to the upper housing 102 at its periphery, and include respective hinges 304, 306 at their respective junctions with the upper housing 102 so that the hooks 300, 302 can be folded down into a storage position while not in use. The hooks 300, 302 are represented in the storage position using dashed lines in FIG. 3.

Figure 4:
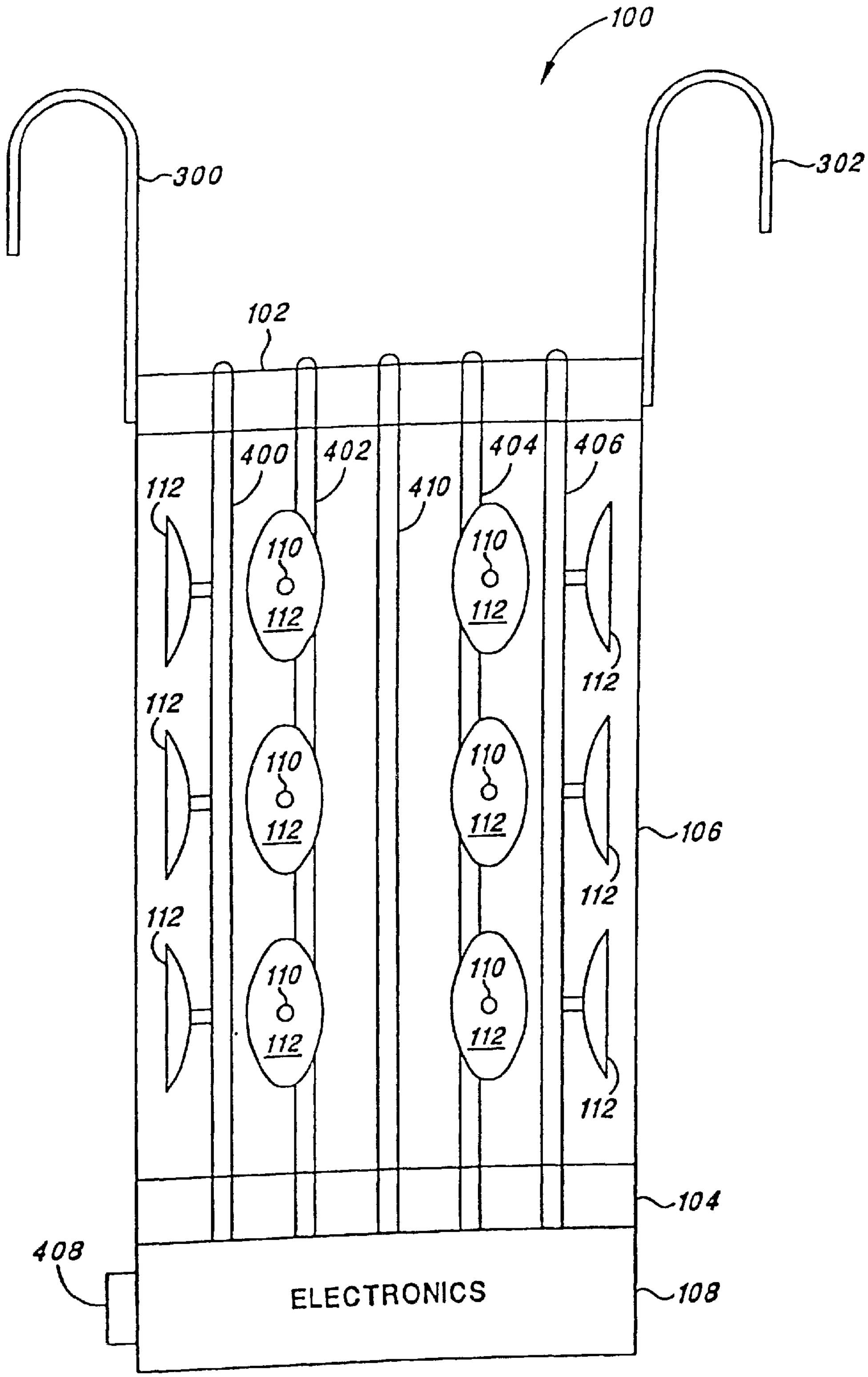
FIG. 4 is a side view of an additional embodiment of the remotely-activated high-candlepower illumination system of FIG. 1A wherein rows of lamps and reflectors arranged on a plurality of vertical posts within a transparent cylindrical globe direct illumination over a 360 degree range.

Referring next to FIG. 4, a side view is shown of an additional embodiment of the remotely-activated high-candlepower illumination system 100. Shown are the upper and lower housings 102, 104, the electronics housing 108, the transparent cylindrical globe 106, the lamps 110, the reflectors 112, and the pair of hooks 300, 302. In the embodiment shown, plurality of posts 400, 402, 404, 406, for example, four posts 400, 402, 404, 406 each support three lamps 110, with corresponding reflectors 112. A control port 408 houses the manual switch, if present, for manually controlling the lamps, including possibly turning on and off individual lamps or the lamps as a group and/or for dimming or brightening individual lamps or the lamps as a group, and a connector to which an external power source, such as power from the vehicle's battery or an A.C. adapter, may be connected to the remotely-activated high-candlepower illumination system 100. Also shown is a central post 410, which serves to hold the upper and lower housings 102, 104 together with the transparent cylindrical globe 106 interposed posed thereinbetween.

The illumination properties of the remotely-activated high-candlepower illumination system 100 of FIG. 4 are similar to those described hereinabove with respect to FIG. 1A.

Figure 5:
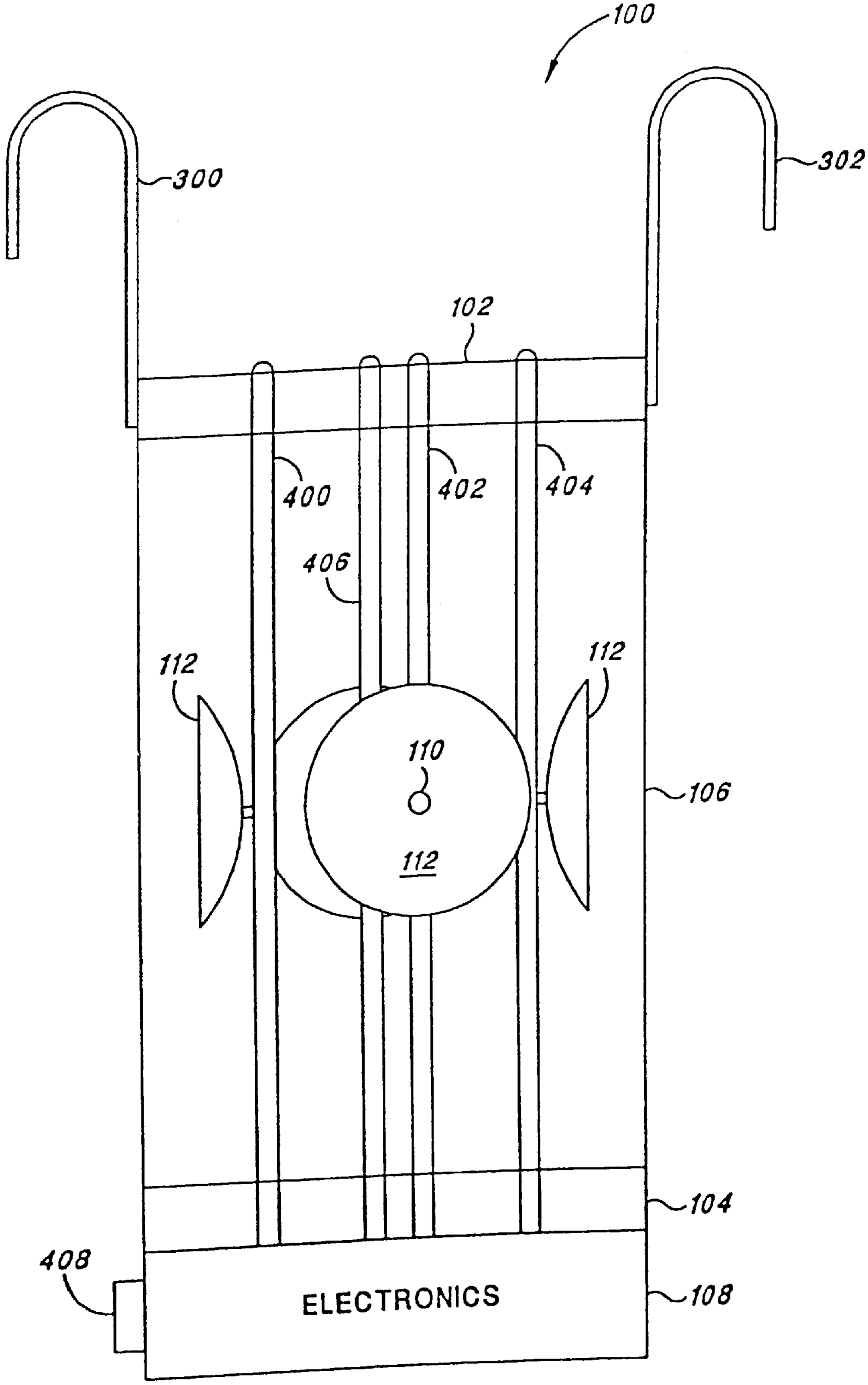
FIG. 5 is a side view of a further embodiment of the remotely-activated, high-candlepower illumination system of FIG. 1A wherein a single row of lamps and reflectors arranged on a plurality of vertical posts within a transparent cylindrical globe direct illumination over a 360 degree range.

Referring next to FIG. 5, a side view is shown of a further embodiment of the remotely-activated, high-candlepower illumination system 100. Shown are the upper and lower housings 102, 104, the electronics housing 108, the transparent cylindrical globe 106, the lamps 110, the reflectors 112, the pair of hooks 300, 302, the posts 400, 402, 404, 406 and the control port 408. In the embodiment shown, the plurality of posts 400, 402, 404, 406, in this case, four posts 400, 402, 404, 406 each support a single lamp 110 and corresponding reflector 112.

The lamps shown in FIG. 5 have illumination properties similar to lamps described in reference to FIG. 1A.

Figure 6:
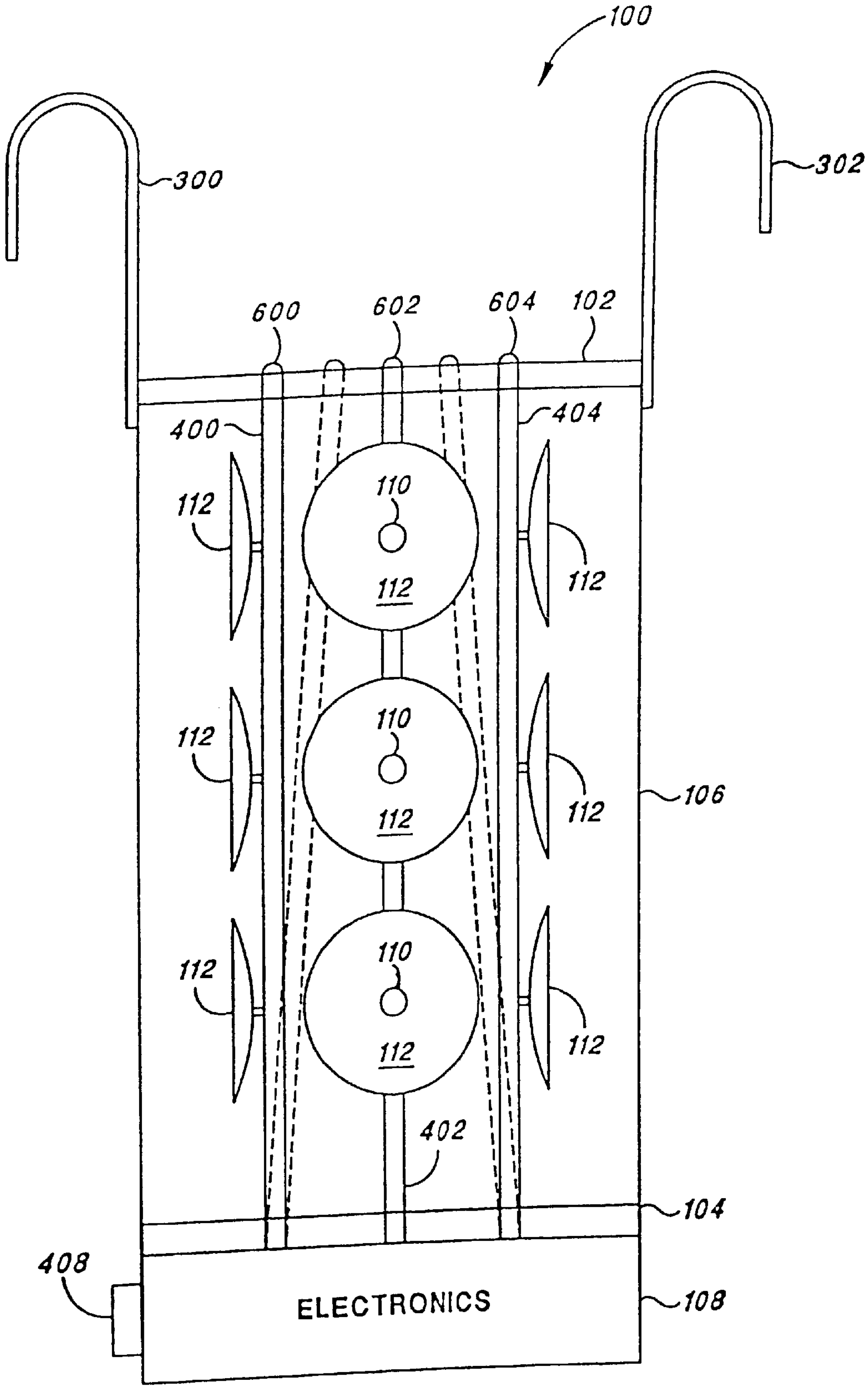
FIG. 6 is a side view of another embodiment of the remotely-activated, high-candlepower illumination system of FIG. 1A wherein rows of lamps and reflectors arranged on a plurality of posts within a transparent cylindrical globe direct illumination over a 360 degree range, wherein the posts are adjustable from vertical to several degrees off-vertical in order to direct the light more upwardly or more downwardly.

Referring next to FIG. 6, a side view is shown of another embodiment of the remotely-activated, high-candlepower illumination system 100. Shown are the upper and lower housings 102, 104, the electronics housing 108, the transparent cylindrical globe 106, lamps 110, corresponding reflectors 112, the plurality of posts 400, 402, 404, 406, in case four posts, 400, 402, 404, (with the fourth post 406 being hidden from view in FIG. 6 behind the post 402) the hooks 300, 302 and the control port 408. In the embodiment shown, a plurality of posts 400, 402, 404 each support three lamps 110, and corresponding reflectors 112.

The lamps 110 have illumination properties, most of those described hereinabove with respect to FIG. 1A.

As shown in FIG. 6, a control knob 600, 602, 604 at respective upper ends of each of the posts 400, 402, 404 when loosened, permits the corresponding posts to slide within a slot in the upper housing 102. With a basal end of each post 400, 402, 404 hinged in the lower housing 104, this slidable movement in the slot in the upper housing 102 results in an angular displacement of the posts, and as a result the lamps 110 and reflectors 112 are affixed thereto. Thus, the direction in which light is emitted from the remotely-activated high-candlepower illumination system 100 can be adjusted by adjusting the angle of the posts 400, 402, 404 after loosening the control knob 602, 604 associated therewith. Displacement of two of the posts 400, 404 is depicted in FIG. 6 using dashed lines.

The control knob 600, 602, 604 may be a knurled thumbscrew, that frictionally engages the upper housing 102 when tightened; a spring loaded clamp that opens into teeth in the slot in the upper housing 102 when released, but that permits slidable movement of the posts 400, 402, 404 when compressed, such as with the user's fingers; or a rubberized knob that frictionally engages interior edges of the slots in the upper housing 102 and can be moved with pressure applied radially to the upper ends of the posts 400, 402, 404 (and possibly while squeezing the rubberized knob).

Alternatively, there may be similar control knobs (not shown) at basal ends of the posts 400, 402, 404 such that more extreme angular deflection of the posts 400, 402, 404 may be achieved. In particular variations, the control knobs at the basal ends of the posts, which control the movement of the basal ends of the posts 400, 402, 404 in slots in the lower housing 104, may be more permanent in nature, such as thumbscrews or even conventional screws requiring a screw driver to loosen, whereas the control knobs 600, 602, 604 at the upper ends of the posts 400, 402, 404 may be selected to be easily adjusted, such as spring-loaded clamps, whereby a general preferred angle for the posts 400, 402, 404 may be selected using the lower control knobs, with periodic fine tuning occurring using the upper control knobs 600, 602, 604. When lower control knobs are employed, appropriate openings in the electronics housing 108 are made to provide access to the lower control knobs and to permit the basal ends of the posts 400, 402, 404 to move in the slots within the lower housing 104.

Figure 7:
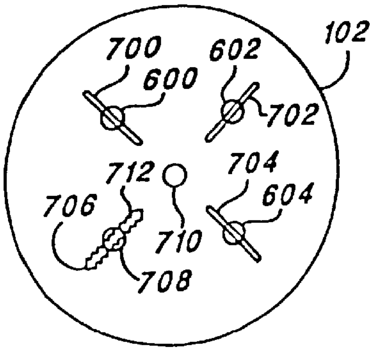
FIG. 7 is a top view of the embodiment of the remotely-activated, high-candlepower illumination system of FIG. 6 showing slots in a top housing and adjustors used to adjust the posts from vertical to off-vertical in order to direct light in a desired pattern.

Referring next to FIG. 7, a top view is shown of the embodiment of the remotely-activated, high-candlepower illumination system 100. Shown are the slots 700, 702, 704, 706, in the upper housing 102, the control knobs 600, 602, 604, 708 at the upper end of each of the posts 400, 402, 406 (see FIG. 6) and an additional post (hidden by the post 402 in FIG. 6) and an upper end of a center post 710 (also hidden in FIG. 6 by the post 402). As can be seen, the control knobs 600, 602, 604, 708 each control movement of a respective post within a respective slot 700, 702, 704, 706 in the upper housing. Note that the slot 708 is shown as having teeth 712 such as would be the case in variations employing the above-mentioned spring-loaded clamp-type control knob. The other slots 700, 702, 704 are shown without teeth such as would be the case in other variations described herein.

Figure 8:
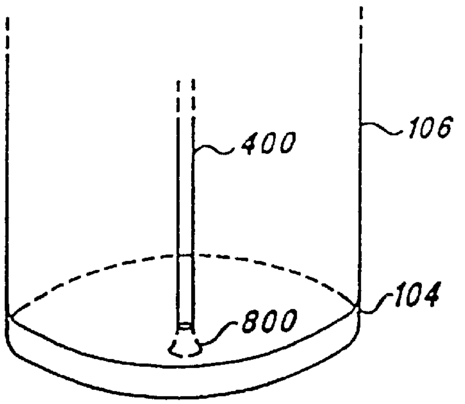
FIG. 8 is a partial perspective view of a variation of the embodiment of the remotely-controlled, high-candlepower illumination system of FIG. 6 showing a pivot at a base end of one of the posts connected to a bottom housing.

Referring next to FIG. 8, a partial perspective view is shown of a variation of the embodiment of the remotely-controlled, high-candlepower illumination system. Shown is the lower housing 104, a portion of the transparent cylindrical globe 106, and one of the posts 400. Also shown is a hinge 800 at which the post pivots at the lower housing 104 when adjusted within the slot of the top housing. The hinge 800 is omitted in variations where slots in the lower housing 106 are also employed to permit movement of the basal ends of the posts within the slots in the lower housing when respective control knobs are activated.

Figure 9:
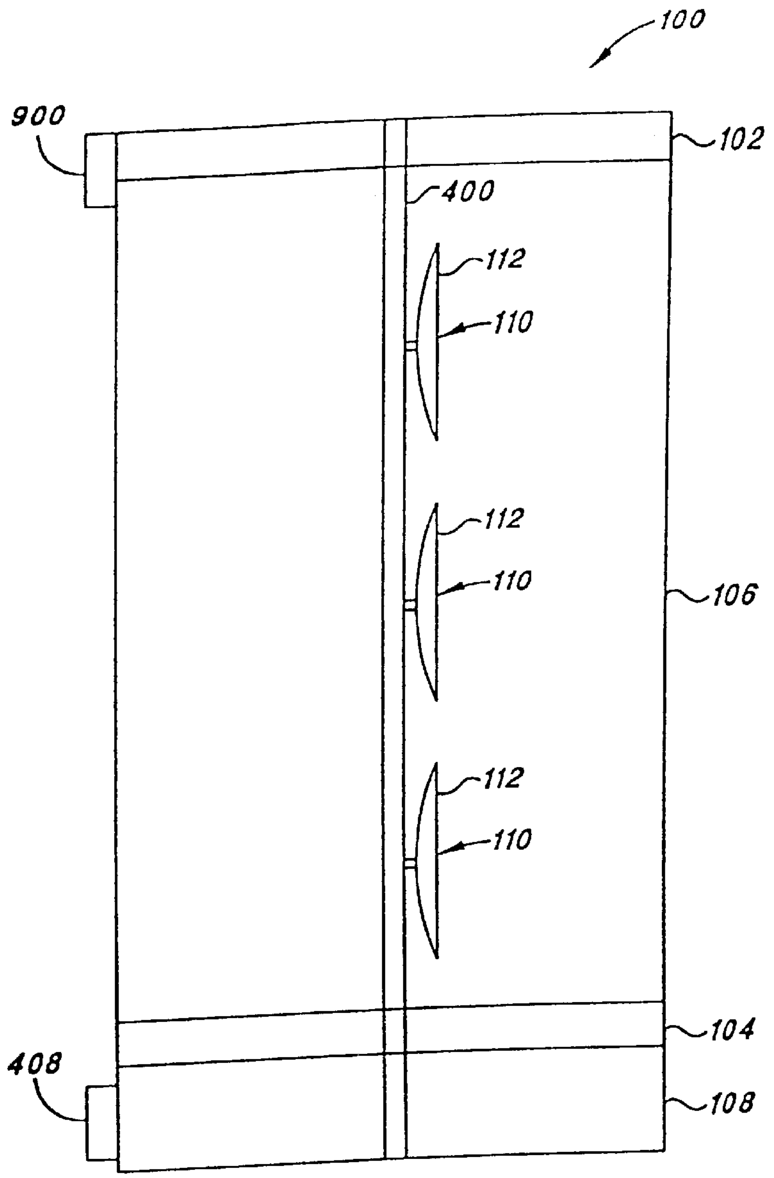
FIG. 9 is a side view of another further embodiment of the remotely-activated, high-candlepower illumination system of FIG. 1A wherein rows of lamps and reflectors arranged on a single of vertical post within a transparent globe direct illumination over, for example, a 180 degree to 360 degree range.

Referring next to FIG. 9, a side view is shown of another further embodiment of the remotely-activated, high-candlepower illumination system 100. Shown are a single post 400, three lamps 110 and corresponding reflectors 112 mounted on the post 400, the upper housing 162, the lower housing 104, the transparent cylindrical globe 106 and the electronics housing 108.

As with the embodiments above, in practice, a receiver within the electronics housing 108 receives signals from the transmitter (not shown) via the radio frequency communications channel (not shown) in the form of "on" signals, and "off" signals. Upon receipt of the "on" signal, the receiver controls an electronic switch within the electronics housing 108 to connect power from the battery within the electronic housing 108 to the lamps 110, and upon receipt of an "off" signal from the transmitter, the receiver controls the electronic switch to disconnect power from the lamps 110, causing them to extinguish.

The embodiment shown is particularly suited for mounting in a fixed location, such as inside the windshield of an automobile, using a mounting bracket 900. For example, in one embodiment, the illumination system may be attached to a suspension arm which extends from the ceiling of the automobile so that when not in use, the illumination system may be folded flush against the ceiling. The mounting bracket 900 may be mounted using any of a number of methods such as using an adhesive, such as is commonly used to affix a rear view mirror to the windshield; screws; rivets; bolts; nails; suction cup or the like.

Advantageously, power from the automobile may be used in lieu of power from the battery within the electronics housing 106, either through a direct electrical connection between the vehicle's power distribution harness and the control port 408, through a cigarette lighter adaptor, such as are common in the art or through an A.C. adapter, such as are common in the art, coupled to the control port 408.

Further advantageously, as with other embodiments described herein, the remotely-activated, high-candlepower illumination system 100 of the present embodiment is activated by transmissions in the communications channel. The communications channel can in accordance with the present embodiment be thirty feet or more in length, thereby allowing an operator of the vehicle, for example, to activate the remotely-activated high-candlepower illumination system from a point remote from the user's automobile. As a result of this remote activation, a safe and well-illuminated environment surrounding the vehicle is assured upon approach of the user to the vehicle or departure of the user from the vehicle.

As with other embodiments, the clear illumination provided by the lamps preferably illuminates an area at a minimum average maintained illuminance of at least 0.2 foot-candles from a distance of from at least 15 to 30 feet or more. The lamps 110 are preferably Halogen, Krypton, or other high-output lamps, such as those mentioned above.

Advantageously, the embodiment shown may also be employed outside of a vehicle, such as mounted on a vehicle's hood, roof, or trunk, may be used outside or inside a building or may be used in a portable, i.e., not mounted from. When used outside a building, appropriate design changes, such as are known in the art, to allow operation from a 120 volt alternating current electrical supply may be made, or an appropriate power adaptor, e.g., 120 volt A.C. to 12 volt D.C. (the standard to automobiles), may be employed. When used in a portable form, or even in a building or in an automobile, the radio controlled electronic switch may be omitted and only the manual switch in the control port may be used. In this variation, the manual switch may be a knob with a plurality of positions for illuminating individual lamps or combinations of lamps. A separate knob may be used to dim the lamps independently, in groups, or all together.

Figure 10:
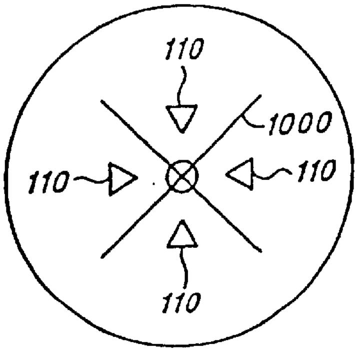
FIG. 10 is a top cross-sectional view of a quadrant reflector variation of a reflector arrangement useable with the remotely-activated, high-candlepower illumination system of FIG. 1A.

Referring next to FIG. 10, a top cross-sectional view is shown of a variation of a reflector arrangement useable with the remotely-activated, high-candlepower illumination system. In the embodiment shown a four quadrant reflector is employed. Shown is the reflector 1000, and 1000 each of four lamps 110 deployed one per quadrant about the reflector.

Figure 11:
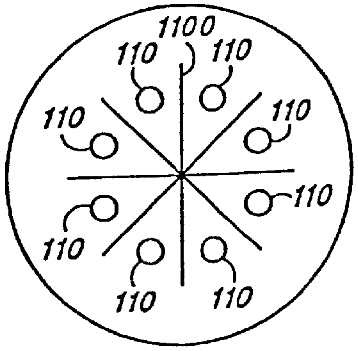
FIG. 11 is a top cross-sectional view of eight-sectioned variation of a reflector arrangement useable with the remotely-activated, high-candlepower illumination system of FIG. 1A.

Referring next to FIG. 11, a top cross-sectional view is shown of another variation of a reflector arrangement useable with the remotely-activated, high-candlepower illumination system. In the embodiment, an eight section reflector 1100 design is shown. Shown are the reflector 1100 and eight lamps 110 deployed one per sector about the reflector 1100.

Figure 12:
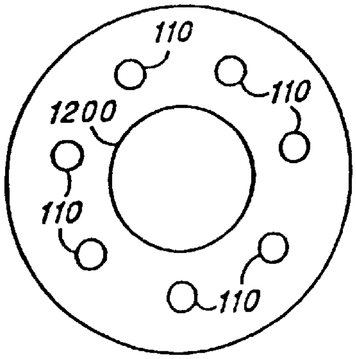
FIG. 12 is a top cross-sectional view of a cylindrical variation of a reflector arrangement useable with the remotely-activated, high-candlepower illumination system of FIG. 1A.

Referring next to FIG. 12, a top cross-sectional view is shown of a further variation of a reflector arrangement useable with the remotely-activated, high-candlepower illumination system. In the embodiment shows, a cylindrical reflector 1200 is shown. Shown are the reflector 1200, and each of eight lamps 110 deployed at equal intervals about the reflector.

Figure 13:
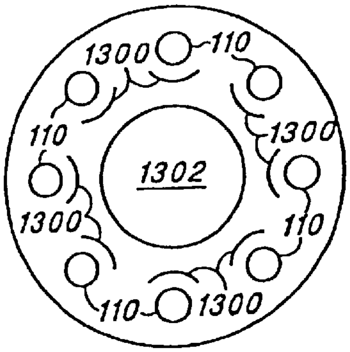
FIG. 13 is a top cross-sectional view of a cylindrical variation of an individual lamp and reflector arrangement (wherein the lamps and reflectors are possibly staggered in height) useable with the remotely-activated, high-candlepower illumination system of FIG. 1A.

Referring next to FIG. 13, a top cross-sectional view is shown of another further variation of a reflector arrangement useable with the remotely-activated, high-candlepower illumination system. In the embodiment shown an individual reflector 1300 is employed for each of eight lamps 1100. Each of the lamps is spaced about a large control column 1302, which serves to support the lamps at staggered heights (such as in a spiral pattern around and up the central column 1302 such as in the embodiment of FIG. 1) so as to accommodate the reflectors 1300.

Figure 14:
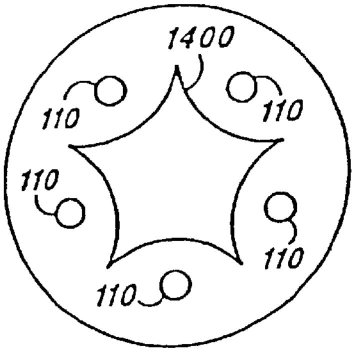
FIG. 14 is a top cross-sectional view of star-like variation of a reflector arrangement useable with the remotely-activated, high-candlepower illumination system of FIG. 1A.

Referring next to FIG. 14, a top cross-sectional view is shown of another further variation of a reflector arrangement useable with the remotely-activated, high-candlepower illumination system. In the embodiment shown a star-like reflector 1400 is employed. Shown are the reflector 1400 and five lamps 110 positioned between each of five points on the star-like reflector 1400.

Figure 15:
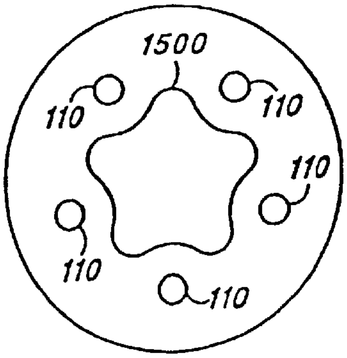
FIG. 15 is a top cross-sectional view of a curved star-like variation of a reflector arrangement useable with the remotely-activated, high-candlepower illumination system of FIG. 1A.

Referring next to FIG. 15, a top cross-sectional view is shown of a supplemental variation of a reflector arrangement useable with the remotely-activated, high-candlepower illumination system. In the embodiment shown a curved star-like reflector 1500 is employed. Shown are the reflector 1500, and each of five lamps 110 positioned between each of five curved lobes on the curved star-like reflector 1500.

Figure 16A:
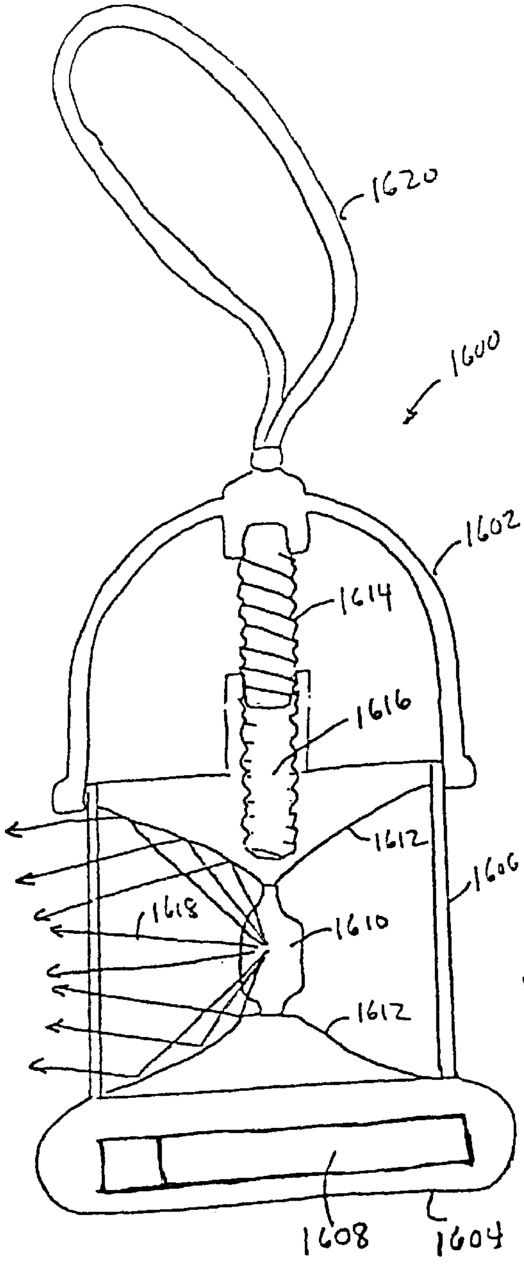
FIG. 16A is a side view of an additional embodiment of a remotely-activated, high-candle power illumination system of FIG. 1A for an automobile using a single lamp illumination and a dual-parabolic reflector design.
Figure 16B:
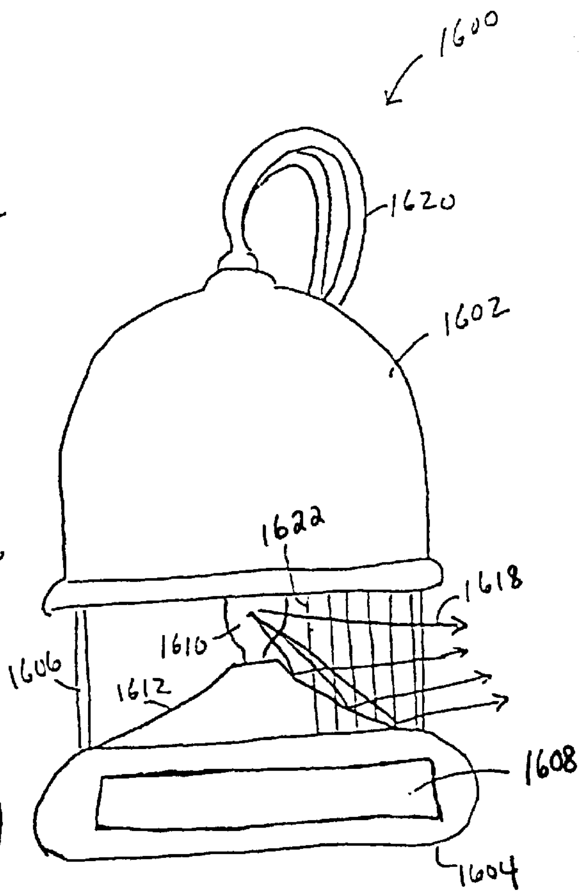
FIG. 16B is a side view of the embodiment of the remotely-activated, high-candle power illumination system of FIG. 16A having a lowered top housing.

Referring next to FIGS. 16A and 16B, a side view is shown of an additional embodiment of a remotely-activated, high-candle power illumination system of FIG. 1A for an automobile using a single lamp illumination and a dual-parabolic reflector design. The illumination system 1600 includes top housing 1602, bottom housing 1604, transparent cylindrical globe 1606 (or cylindrical lens), electronics housing 1608, lamp 1610, parabolic reflectors 1612, screw assembly 1614, threaded screw receiver 1616, beams of light 1618, a lanyard 1620, and ribs 1622.

In this embodiment, the lamp 1610 is held in place between two parabolic reflectors 1612 (also referred to as a dual parabolic reflector assembly) between the top housing 1602 and the bottom housing 1604. The bottom housing contains the electronics housing 1608, which contains the electronics as described in FIGS. 2A–2D. The top housing 1602 includes a lanyard 1620 or similar means to attach the illumination system 1600 to the rear view mirror, for example, of the vehicle. Alternative attaching means may be employed to rigidly attach the illumination system 1600 to the interior or the vehicle, for example, to a retractable arm attached to the interior ceiling of the vehicle. Additionally, the top housing 1602 is moveable via the screw assembly 1614 and the screw receiver 1616, so that the top housing (which is dome-shaped or hood-shaped) can be adjusted to block some of the beams of light 1618 emitted from the illumination system 1600. This is best illustrated in FIG. 16B, in which the top housing 1602 blocks some of the beams of light 1618 that are emitted from the illumination system 1600 to control the spread of light vertically. Thus, as shown in FIG. 16B, the beams of light 1618 reflected from the top parabolic reflector 1612 are blocked by the top housing. The beams of light 1618 that are blocked, if not blocked, may interfere with the vision of the operator.

This embodiment only uses one high-candle power lamp 1610 that emits light in a 360 degree spread from the interior of the vehicle. This is in contrast to the embodiments shown in FIGS. 1A and 4–15, which show multiple lamps.

However, it has been found that one lamp capable of producing the desired candlepower, including two parabolic reflectors 1612 is adequate to sufficiently illuminate an area outside of the vehicle, as described earlier in the specification. The same type of lamp 1610 may be used as described above; however, the transparent cylindrical globe 1606 or lens includes vertical ribs 1622 (shown only in FIG. 16B) that create prisms that columnate the light horizontally, to create a directional pattern that maximizes the range of light dispersion, in a 360 degree band emanating from the lamp 1610.

The dual-parabolic reflector system (comprises two parabolic reflectors 1612) is especially designed to maximally reflect beams of light 1618 horizontally from the illumination system 1600; thus, to illuminate a region outside of the vehicle at least 15 feet, and at least 180 degrees around the vehicle. Additionally, the embodiment shown may be used with a flash circuit in conjunction with a car alarm, such that the illumination system 1600 may be a personal protection device as well as a property protection device, which relates to personal protection.

Additionally, while a lanyard 1620 is shown, alternative embodiments may not use a lanyard 1620 at all to position the housing (i.e. top housing 1602 and the bottom housing 1604) within the vehicle. For example, the bottom housing 1604 may be formed flat as shown such that the illumination system 1600 will simply rest on the dashboard of the vehicle. Alternatively, other devices, such as hooks, etc. may be used instead of a lanyard 1620 to hang the illumination system 1600 on a rearview mirror, for example. In yet other embodiments, the illumination system 1600 may be mounted on an extendable arm or other device attached into the ceiling of the vehicle or simply molded in the ceiling of the vehicle along with other vehicle controls, such as mirrors, vent systems, radios, etc.

The electronics housing 1608 contains the electronics subsystems as described above with reference to FIGS. 2A through 2E, such as the receiver, the RF controlled switch, and the secondary controlled switch. The electronics subsystems respond again to the transmitter, usually located on the keychain of the operator, which sends RF signals to the electronics subsystem of the electronics housing 1608 of the illumination system 1600.

Referring finally to FIG. 17, a side view is shown of a further embodiment of a remotely-activated, high-candle power illumination system of FIGS. 16A and 16B for an automobile using a single lamp illumination and a dual-parabolic reflector design. The illumination system 1700 includes top housing 1602, bottom housing 1604, transparent cylindrical globe 1606 (or cylindrical lens), electronics housing 1608, lamp 1610, parabolic reflectors 1612, beams of light 1618, ribs 1622, hook 1702, power supply 1704, cigarette power adapter 1706, power cord 1708, an on/off switch 1710, and an optional speaker grill 1712 that covers an optional siren 1714.

This embodiment of the illumination system 1700 is similar to the embodiment shown in FIGS. 16A and 16B, except the illumination system 1700 is formed so that the illumination system may be positioned within the vehicle within a beverage container, for example. The bottom housing is molded so as to fit a standard beverage container. This allows for easy storage in the vehicle when the illumination system is not in use, i.e. not hanging from the rear view mirror or resting on the dash or resting in position in the rear window, for example. Additionally, the illumination system may be operated from the beverage container, if the beverage container is located within the console or dashboard of the vehicle, so as to allow light to extend outside of the vehicle. Thus, the beverage container should be located as high on the dashboard, door, or console as possible, and not located on the floorboards of the vehicle.

This embodiment of the illumination system 1700 also includes a power supply, such as the battery 204, which may be rechargeable or not. An alternative power supply may be from the car battery through the cigarette lighter. The cigarette power adapter and the power cord will enable the illumination system to be powered by the vehicle's battery. This may further provide a charging current to a power supply that is a rechargeable battery. Also shown is a manual on/off switch 1710 or button. The electronics housing 1608 is the same as that shown in FIGS. 16A and 16B. For example, the electronics housing includes the various electronics as described above. For example, the electronics housing contains the receiver, the RF controlled switch and the secondary controlled switch.

Note that the top housing in this embodiment does not raise or lower itself to block part of the emitted beams of light 1618; however, could also be designed to do so.

Furthermore, this embodiment of the illumination system also includes an optional siren 1714 underneath an optional speaker grill 1712, as described above with reference to FIG. 2E. Thus, the illumination system of FIG. 17 , as well as any other of the embodiments described above may include the optional siren 1714. The siren 1714 is coupled to the electronics of the electronics housing 1608, for example, as described with reference to FIG. 2E. The siren 1714 emits a high decibel siren or noise, much like a car audio alarm system. The siren 1714 is activated in response to the illumination of the lamp 1610 (which either emits a constant light or a flashing light in the form of the beams of light 1618). Thus, in this embodiment, the illumination system 1700 also incorporates its own car audio type siren alarm without relying on an external car audio alarm system being in place. Such sirens are well known in the art of car audio alarm systems; thus, no further explanation is required.

While the invention herein disclosed has been described by means of specific embodiments and applications thereof, numerous modifications and variations could be made thereto by those skilled in the art without departing from the scope of the invention set forth in the claims. For example, improvements in the transmitter and receiver (particularly in reception by utilizing external, coiled, or looped antennae within the embodiment without affecting the transmission signal or power) may permit operation over large distances, e.g., over 50 or 100 feet, and improvements in lamp design and characteristics may allow increased illuminance without unduly increasing the power required by the lamps.

An elongated design (see, for example, FIG. 11) may be selected in order to shield the lamps and minimize the surface luminescence of the luminaire, or glare; in the interest of improving visibility in the area surrounding the vehicle.

What is claimed is:

1. A method of illuminating a region outside a vehicle comprising:

receiving a signal from outside of the vehicle;

activating, in response to the receiving the signal, at least one lamp within the vehicle, the at least one lamp oriented to provide light substantially horizontally; and illuminating, in response to the activating of the at least one lamp, the region outside the vehicle, and at least 180 degrees around the vehicle, wherein the illuminating includes projecting light from the at least one lamp within the vehicle to the region outside the vehicle.

2. The method of claim 1 wherein said illuminating comprises illuminating intermittently, in response to the activating of the at least one lamp, the region outside the vehicle, and at least 180 degrees around the vehicle, wherein the illuminating intermittently includes projecting light in a flashing manner from the at least one lamp within the vehicle to the region outside the vehicle.

3. The method of claim 2 wherein said illuminating intermittently includes projecting light in a flashing manner at a predetermined flash rate between flashes of illumination.

4. The method of claim 2 wherein said illuminating intermittently further includes using a flash circuit coupled to the at least one lamp.

5. The method of claim 1 wherein said receiving comprises receiving a motion signal from outside of the vehicle.

6. The method of claim 1 wherein said receiving comprises receiving a visual signal from outside of the vehicle.

7. The method of claim 1 wherein said receiving comprises receiving a radio frequency signal from outside of the vehicle.

8. The method of claim 7 further comprising:

activating a transmitter; and transmitting the radio frequency signal to a receiver, wherein said receiving includes receiving the radio frequency signal in the receiver.

9. The method of claim 1 wherein said receiving comprises receiving an audio signal from outside of the vehicle.

10. The method of claim 1 further comprising activating, in response to receiving an alarm signal from within the vehicle, said at least one lamp.

11. The method of claim 10 wherein said activating, in response to said alarm signal, comprises activating, in response to an alarm signal received from a vehicle alarm system, said at least one lamp.

12. The method of claim 1 further comprising activating, in response to said activating of said at least one lamp, a siren.

13. The method of claim 1 wherein the illuminating includes projecting light to said region at at least an average maintained illuminance of 0.2 foot candles around said vehicle.

14. A remotely-controlled illumination system comprising:

at least one lamp for providing illumination at least 180 degrees around an automobile, the at least one lamp oriented to provide light substantially horizontally;

a remotely controlled switch coupled to the at least one lamp;

a power source selectively coupleable through the remotely controlled switch to the at least one lamp;

a housing coupled to the at least one lamp; and means, coupled to the housing, for positioning the housing within the automobile.

15. The system of claim 14 further comprising a flash circuit coupled in between said remotely controlled switch and said at least one lamp, wherein the flash circuit causes said at least one lamp to provide illumination intermittently.

16. The system of claim 14 further comprising a reflector coupled to said housing for reflecting light from said at least one lamp.

17. The system of claim 14 further comprising:

a transmitter for sending an "on" signal and an "off" signal to said remotely controlled switch.

18. The system of claim 14 wherein said remotely controlled switch comprises a radio frequency controlled switch.

19. The system of claim 14 wherein said remotely controlled switch comprises a motion controlled switch.

20. The system of claim 14 wherein said remotely controlled switch comprises an audio controlled switch.

21. The system of claim 14 wherein said remotely controlled switch comprises a visual controlled switch.

22. The system of claim 14 wherein said remotely controlled switch comprises a voltage controlled switch.

23. The system of claim 14 further comprising an alarm input coupled to said at least one lamp, wherein said at least one lamp is activated by an alarm signal received at the alarm input.

24. The system of claim 23 wherein said alarm input receives said alarm signal from an automobile alarm system within said automobile.

25. The system of claim 14 further comprising a siren coupled to said remotely controlled switch, wherein said power supply is selectively coupleable through said remotely controlled switch to said siren.

26. The system of claim 14 further comprising a second switch coupled to said at least one lamp, wherein said power source is selectively coupleable through the second switch to said at least one lamp.

27. The system of claim 26 wherein said second switch is selected from a group consisting of: a motion controlled switch, a visual controlled switch, an audio controlled switch, and a voltage controlled switch.

28. The system of claim 26 further comprising a flash circuit coupled in between said second switch and said at least one lamp, wherein the flash circuit causes said at least one lamp to provide illumination intermittently.

29. The system of claim 26 further comprising a siren coupled to said second switch, wherein said power supply is selectively coupleable through said second switch to said siren.

30. The system of claim 14 wherein the at least one lamp for providing illumination at at least an average maintained illuminance of 0.2 foot candles around said automobile.

31. A method of illuminating a region outside a vehicle comprising:

receiving an audio signal;

activating, in response to the receiving the audio signal, at least one lamp within the vehicle, the at least one lamp oriented to provide light substantially horizontally; and illuminating, in response to the activating of the at least one lamp, the region outside the vehicle, and at least 180 degrees around the vehicle, wherein the illuminating includes projecting light from the at least one lamp within the vehicle to the region outside the vehicle.

32. The method of claim 31 wherein said receiving comprises receiving said audio signal from within the vehicle.

33. The method of claim 31 wherein the illuminating includes projecting light to said region at at least an average maintained illuminance of 0.2 foot candles around said vehicle.

* * * * *